(12) United States Patent
Patil et al.

(10) Patent No.: US 9,315,761 B2
(45) Date of Patent: Apr. 19, 2016

(54) LUBRICANT AND FUEL DISPERSANTS AND METHODS OF PREPARATION THEREOF

(71) Applicant: ExxonMobil Chemical Patents Inc., Baytown, TX (US)

(72) Inventors: Abhimanyu Onkar Patil, Westfield, NJ (US); Satish Bodige, Wayne, NJ (US); Liehpao Oscar Farng, Lawrenceville, NJ (US); Kathryn L. Peretti, Beaumont, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 247 days.

(21) Appl. No.: 14/017,721

(22) Filed: Sep. 4, 2013

(65) Prior Publication Data

US 2014/0087983 A1    Mar. 27, 2014

Related U.S. Application Data

(60) Provisional application No. 61/703,892, filed on Sep. 21, 2012.

(51) Int. Cl.
| | | |
|---|---|---|
| *C10M 149/04* | (2006.01) | |
| *C10M 133/54* | (2006.01) | |
| *C10M 149/14* | (2006.01) | |
| *C10M 149/16* | (2006.01) | |
| *C10L 1/223* | (2006.01) | |
| *C10L 1/238* | (2006.01) | |
| *C10L 1/2383* | (2006.01) | |

(52) U.S. Cl.
CPC .............. *C10M 149/04* (2013.01); *C10L 1/238* (2013.01); *C10L 1/2383* (2013.01); *C10M 133/54* (2013.01); *C10M 149/14* (2013.01); *C10M 149/16* (2013.01); *C10M 2205/0285* (2013.01); *C10M 2215/042* (2013.01); *C10M 2215/064* (2013.01); *C10M 2215/26* (2013.01); *C10M 2215/28* (2013.01); *C10M 2217/06* (2013.01); *C10N 2230/02* (2013.01); *C10N 2230/04* (2013.01); *C10N 2230/10* (2013.01); *C10N 2240/10* (2013.01); *C10N 2270/00* (2013.01)

(58) Field of Classification Search
CPC ............. C10M 149/04; C10M 149/14; C10M 149/16; C10M 11/54; C10M 2215/26; C10M 2215/28; C10M 2215/042; C10M 2215/064; C10M 2217/06; C10M 2205/0285; C10N 2230/02; C10N 2230/04; C10N 2230/10; C10N 2240/10; C10N 2270/00; C10L 1/238; C10L 1/2383
USPC ................................................. 508/304, 545
See application file for complete search history.

(56) References Cited

U.S. PATENT DOCUMENTS

| | | | |
|---|---|---|---|
| 3,275,554 A | 9/1966 | Wagenaar | |
| 3,438,757 A | 4/1969 | Honnen et al. | |
| 3,794,586 A * | 2/1974 | Kimura et al. | 508/259 |
| 4,827,064 A | 5/1989 | Wu | |
| 4,827,073 A | 5/1989 | Wu | |
| 4,889,647 A | 12/1989 | Rowan et al. | |
| 4,956,122 A | 9/1990 | Watts et al. | |
| 4,978,464 A | 12/1990 | Coyle et al. | |
| 5,155,247 A | 10/1992 | Herrmann et al. | |
| 5,319,030 A | 6/1994 | Harrison et al. | |
| 5,321,094 A * | 6/1994 | McGee | 525/387 |
| 5,496,892 A | 3/1996 | Markert et al. | |
| 5,616,153 A | 4/1997 | Mike et al. | |
| 6,140,541 A | 10/2000 | Melder et al. | |
| 6,346,129 B1 * | 2/2002 | Sabourin et al. | 44/433 |
| 2003/0013620 A1 | 1/2003 | Wilk | |
| 2003/0171255 A1 | 9/2003 | Greengard et al. | |
| 2006/0105921 A1 * | 5/2006 | Arimoto et al. | 508/189 |
| 2009/0318640 A1 * | 12/2009 | Brant et al. | 526/75 |
| 2011/0147275 A1 | 6/2011 | Ng et al. | |

FOREIGN PATENT DOCUMENTS

| | | |
|---|---|---|
| CA | 12213009 | 1/1996 |
| DE | 19508656 A1 | 9/1995 |
| EP | 0490455 A2 | 6/1992 |
| EP | 0 490 454 | 11/1993 |
| EP | 1040115 B1 | 6/2004 |

(Continued)

OTHER PUBLICATIONS

PCT Application No. PCT/US2013/060413, Communication from the International Searching Authority, Form PCT/ISA/210, dated Dec. 17, 2013, 5 pages.

(Continued)

*Primary Examiner* — James Goloboy

(57) ABSTRACT

This disclosure relates to a composition for use as an additive for fuels and lubricants including an amination product of an epoxidized vinyl terminated macromonomer (VTM) and an amino compound containing at least one —NH— group. The epoxidized VTM is reacted with the amino compound containing at least one —NH— group under amination conditions sufficient to give said composition. The epoxidized VTM is formed by reacting a VTM with an epoxidizing agent under epoxidation conditions sufficient to give an epoxidized VTM. An amination method for making a composition for use as an additive for fuels and lubricants. The method comprises reacting an epoxidized VTM with an amino compound containing at least one —NH— group under amination conditions sufficient to give the composition. The epoxidized VTM is formed by reacting a VTM with an epoxidizing agent under epoxidation conditions sufficient to give an epoxidized VTM.

19 Claims, No Drawings

(56) References Cited

FOREIGN PATENT DOCUMENTS

| | | | |
|---|---|---|---|
| GB | 1395981 | A | 5/1975 |
| JP | 2001031716 | | 2/2001 |
| WO | 8701722 | | 3/1987 |
| WO | 9214806 | | 9/1992 |
| WO | 94/02572 | | 2/1994 |
| WO | 9402527 | | 2/1994 |
| WO | 9931113 | | 6/1999 |
| WO | 2009155471 | A2 | 12/2009 |

OTHER PUBLICATIONS

J. Hafren and A. Cordova, "Direct Organocatalytic Polymerization from Cellulose Fibers", Macromolecular Rapid Communications, 2005, vol. 26, pp. 82-86.

F. Song, D. Pappalardo, A.F. Johnson, B. Reiger and M. Bochmann, "Derivatization of Propene/Methyloctadiene Copolymers: A Flexible Approach to Side-Chain-Functionalized Polypropenes", Journal of Polymer Science Part A: Polymer Chemistry, 2002, vol. 40, pp. 1484-1497.

J. Suzuki, Y. Kino, T. Uozumi, T. Sano, T. Teranishi, J. Jin, K. Soga and T. Shiono, "Synthesis and Functionalization of Poly(ethylene-co-dicyclopentadiene)", Journal of Applied Polymer Science, 1999, vol. 72, pp. 103-108.

X. Li and Z. Hou, "Scandium-Catalyzed Copolymerization of Ethylene with Dicyclopentadiene and Terpolymerization of Ethylene, Dicyclopentadiene and Styrene", Macromolecules, 2005, vol. 38, pp. 6767-6769.

M.C.A. van Vliet, I.W.C.E. Arends and R.A. Sheldon, "Methyltrioxorhenium-catalysed epoxidation of alkenes in trifluroethanol", Chem. Commun., 1999, pp. 821-822.

K. Neimann and R. Neumann, "Electrophilic Activation of Hydrogen Peroxide: Selective Oxidation Reactions in Perfluoronated Alcohol Solvents", Organic Letters, 2000, vol. 2, No. 18, p. 2861-2863.

W.A. Herrmann, R.W. Fischer and D.W. Marz, "Methyltrioxorhenium as Catalyst for Olefin Oxidation", Angew. Chem. Int. Ed. Engl., 1991, vol. 30, No. 12, pp. 1638-.

\* cited by examiner

LUBRICANT AND FUEL DISPERSANTS AND METHODS OF PREPARATION THEREOF

CROSS-REFERENCE TO RELATED APPLICATIONS

This application claims priority to U.S. Provisional Application Ser. No. 61/703,892 filed Sep. 21, 2012, herein incorporated by reference in its entirety.

FIELD

This disclosure relates to fuel and lubricant dispersant products and their methods of preparation, lubricant compositions, methods of lubrication and products so lubricated.

BACKGROUND

Lubricants in commercial use today are prepared from a variety of natural and synthetic base stocks admixed with various additive packages depending upon their intended application. The base stocks typically include mineral oils, polyalphaolefins (PAO), gas-to-liquid base oils (GTL), silicone oils, phosphate esters, diesters, polyol esters, and the like.

A major trend for passenger car engine oils (PCEOs) is an overall improvement in quality as higher quality base stocks become more readily available. Typically the highest quality PCEO products are formulated with base stocks such as PAOs or GTL stocks.

Lubricants are composed of a base stock and additives. Additives are added to the base stock either to enhance an already-existing property, such as viscosity, of base oil or impart a new property, such as detergency, lacking in the base oil. The lubricants are designed to perform a number of functions, including lubrication, cooling, protection against corrosion, and keeping equipment components clean by suspending originally insoluble contaminants in the bulk lubricant. While for automotive applications, all functions are important, suspending the insoluble contaminants and keeping the surface clean are the most critical. This is mainly achieved by the combined actions of detergents and dispersants.

Dispersants are metal-free and hence they do not form ash. The goal of the dispersant is to keep insoluble particles suspended in the bulk lubricant. The dispersants suspend deposit precursors in oil in a variety of ways. These comprise including the undesirable polar species into micelles; associating with colloidal particles, thereby preventing them from agglomerating and falling out of solution; suspending aggregates in the bulk lubricant, if they form; modifying soot particles so as to prevent their aggregation, as the aggregation will lead to oil thickening, a typical problem in heavy-duty diesel engine oils; and lowering the surface/interface energy of the polar species in order to prevent their adherence to metal surfaces.

Conventional dispersants used in PCEOs are prepared via functionalization of polyisobutylene (PIB) of different molecular weights with maleic anhydride or phenol, followed by reaction with polyamines. See Lubricant Additives, Chemistry and Applications, edited by L. R. Rudnick, 2009.

A dispersant molecule consists of three distinct structural features: a hydrocarbon group, a polar group, and a connecting group or a link. The hydrocarbon group is polymeric in nature and typically ranges from molecular weight 600 to 7000. While various polymers such as PIB or polyalphaolefins are used to make dispersants, PIB is most common. The polar group is usually an amine and is basic in character. The class of amines most commonly used to synthesize dispersants are polyalkylenepolyamines, such as diethylenetriamine, triethylenetetramine, and tetraethylenepentamine. The polar group is attached to the polymer via a linking group such as maleic anhydride.

Since it is not easy to attach the polar group directly to the hydrocarbon group, generally a polar group is attached to the hydrocarbon group via a linking group. Alkenylsuccinic anhydride is synthesized by reacting an olefin, such as PIB, with maleic anhydride. Succinimide group results when a cyclic anhydride is reacted with a primary amine. Alkenyl succinic anhydride is the precursor for introducing the succinimide connecting group in dispersants. The polyamine is then reacted with the anhydride to obtain succinimide.

The conventional dispersants prepared via functionalization of PIB of different molecular weights with maleic anhydride or phenol, followed by reaction with polyamines, work well for traditional lubricant formulations. In many automotive engine lubricant formulations, 3 to 15 wt. % of dispersant is used, the highest amount of all additives used in the formulation.

Newer lubricants are formulated to meet higher fuel economy standards, longer oil drain intervals, and more operating severity. This trend calls for the use of even higher concentration of dispersants and lower finished lubricant viscosity. Using a higher amount of PIB-based dispersants increase the finished lubricant viscosity, making the formulation difficult to stay within lower viscosity grades, such as 0W20 or 0W30, for the fuel economy.

Alternatively, formulators are pressed to use even lower viscosity base oil to achieve these fuel-efficient viscosity grades, thus risking other undesirable results, such as higher volatility, reduced lubricant oil film and reduced wear protection, and the like. Thus, there is a need to mitigate the viscosity increasing effect by PIB-based dispersants.

Additional references of interest include: EP 490454; WO 8701722; U.S. Pat. No. 5,616,153; U.S. Application Publication No, 2003/0171225; DE 19508656; WO 9402572; U.S. Pat. No. 5,319,030; and U.S. Application Publication No. 2003/013620.

There is also a need to develop chemical modification routes, especially non-maleic anhydride based, and where the vinyl double bond is more reactive than the traditional vinylidene terminus available in PIB macromers. The present disclosure provides many advantages in meeting these needs, which shall become apparent as described below.

SUMMARY

This disclosure relates in part to a composition for use as an additive for fuels and lubricants comprising an amination product of an epoxidized VTM and an amino compound containing at least one —NH— group, wherein the epoxidized VTM is reacted with the amino compound containing at least one —NH— group under amination conditions sufficient to give the composition.

This disclosure also relates in part to a composition for use as an additive for fuels and lubricants comprising an epoxidation/amination product of a VTM and an amino compound containing at least one NH— group, wherein the VTM is reacted with an epoxidizing agent under epoxidation conditions sufficient to give an epoxidized VTM intermediate, and the epoxidized VTM intermediate is reacted with the amino compound containing at least one —NH— group under amination conditions sufficient to give the composition.

This disclosure further relates in part to a lubricant composition comprising an oil of lubricating viscosity and from 0.1 to 15 weight percent based on the total weight of the lubricant composition of this disclosure, of a composition derived from the amination of an epoxidized VTM and an amino compound containing at least one —NH— group as described herein, or the epoxidation/amination of a VTM and an amino compound containing at least one —NH— group as described herein.

This disclosure yet further relates in part to a vehicle having moving parts and containing a lubricant for lubricating the moving parts, the lubricant comprising an oil of lubricating viscosity and from 0.1 to 15 weight percent based on the total weight of the lubricant composition, of a composition derived from the amination of an epoxidized VTM and an amino compound containing at least one —NH— group as described herein, or the epoxidation/amination of a VTM and an amino compound containing at least one —NH— group as described herein.

This disclosure also relates in part to an amination method for making a composition for use as an additive for fuels and lubricants, the method comprising reacting an epoxidized VTM with an amino compound containing at least one —NH— group under amination conditions sufficient to give the composition.

This disclosure further relates in part to an epoxidation/amination method for making a composition for use as an additive for fuels and lubricants, the method comprising reacting a VTM with an epoxidizing agent under epoxidation conditions sufficient to give an epoxidized VTM intermediate, and reacting the epoxidized VTM intermediate with an amino compound containing at least one —NH— group under amination conditions sufficient to give said composition.

This disclosure yet further relates in part to a dispersant composition for fuels and lubricants represented by the formula $R_1R_2$ or $R_1(X)R_3$ wherein $R_1$ is a VTM group having from 10 to 400 carbon atoms, $R_2$ is an amino group containing at least one —NH— group, X is a polyamino group containing at least two —NH— groups, and $R_3$ is a VTM group having from 10 to 400 carbon atoms; wherein $R_1$ and $R_3$ are the same or different.

In particular, this disclosure relates in part to a process of functionalizing polypropylene, propylene-α-olefin or ethylene-α-olefin having a Mn of 300 to 30,000 g/mol and comprising at least 90% allyl vinyl chain ends. The functionalization process involves contacting an alkene epoxidation catalyst with a vinyl terminated polyolefin. The epoxidation is preferably carried out using $H_2O_2$ in presence of carboxylic acid or catalyst. The epoxide terminated polymers can be reacted with polyamines to obtain dispersant molecules. The dispersant molecule may be reacted with boric acid or with antioxidant molecules like 2,6-di-t-butylphenol, diphenylamine, benzotriazole via formaldehyde addition to obtain multifunctional dispersants (dispersant-antioxidant, dispersant-antiwear).

In addition to improved dispersibility for sludge generated during service of lubricating oils, improved fuel efficiency can also be attained in an engine lubricated with a lubricating oil by using as the lubricating oil a formulated oil in accordance with this disclosure. The formulated oil comprises a lubricating oil base stock as a major component, and a dispersant as a minor component. The lubricating oils of this disclosure are particularly advantageous as passenger vehicle engine oil (PVEO) products.

It has been surprisingly found that a lubricating oil containing an amine dispersant of this disclosure possesses a lower viscosity ($Kv_{100}$) as compared to viscosity ($Kv_{100}$) of a same lubricating oil except containing PIBSI (polyisobutylenesuccinimide) as a dispersant on an equal weight percent basis. It has also been surprisingly found that a lubricating oil containing an amine dispersant of this disclosure can exhibit better oxidation resistance as compared to oxidation resistance of a same lubricating oil except containing PIBSI (polyisobutylenesuccinimide) as a dispersant on an equal weight percent basis.

Further objects, features and advantages of the present disclosure will be understood by reference to the following definitions and detailed description.

DEFINITIONS

In the structures depicted throughout this specification and the claims, a solid line indicates a bond, and an arrow indicates that the bond may be dative.

As used herein, the new notation for the Periodic Table Groups is used as described in *Chemical and Engineering News*, 63(5), 27 (1985).

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise, the terms "functional group," "group," and "substituent" are also used interchangeably in this document. For purposes of this disclosure, "hydrocarbyl radical" is defined to be $C_1$ to $C_{20}$ radicals, that may be linear, branched, or cyclic (aromatic or non-aromatic); and may include substituted hydrocarbyl radicals as defined herein. In an embodiment, a functional group may comprise a hydrocarbyl radical, a substituted hydrocarbyl radical, or a combination thereof.

Substituted hydrocarbyl radicals are radicals in which at least one hydrogen atom has been substituted with a heteroatom or heteroatom containing group, or with atoms from Groups 13, 14, 15, 16, and 17 of the Periodic Table of Elements, or a combination thereof, or with at least one functional group, such as halogen (Cl, Br, I, F), $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like or where at least one heteroatom has been inserted within the hydrocarbyl radical, such as halogen (Cl, Br, I, F), O, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen or a hydrocarbyl radical, or any combination thereof.

In an embodiment, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated, and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including, where appropriate, cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (cyclobutenyls and cyclopropenyls). Cyclic compounds having substitutions include all isomer forms, for example, methylphenyl would include ortho-methylphenyl, meta-methylphenyl, and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is a polymer having a low molecular weight. In some embodiments, an oligomer has an Mn of 21,000 g/mol or less (e.g., 2,500 g/mol or less); in other embodiments, an oligomer has a low number of mer units (such as 75 mer units or less).

An "alpha-olefin" is an olefin having a double bond at the alpha (or 1-) position. A "linear alpha-olefin" or "LAO" is an olefin with a double bond at the alpha position and a linear hydrocarbon chain. A "polyalphaolefin" or "PAO" is a polymer having two or more alpha-olefin units. For the purposes of this disclosure, the term "α-olefin" includes $C_2$-$C_{20}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

For purposes herein, a polymer or polymeric chain comprises a concatenation of carbon atoms bonded to each other in a linear or a branched chain, which is referred to herein as the backbone of the polymer (e.g., polyethylene). The polymeric chain may further comprise various pendent groups attached to the polymer backbone which were present on the monomers from which the polymer was produced. These pendent groups are not to be confused with branching of the polymer backbone, the difference between pendent side chains and both short and long chain branching being readily understood by one of skill in the art.

The terms "catalyst" and "catalyst compound" are defined to mean a compound capable of initiating catalysis. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, an optional activator, an optional co-activator, and an optional support material, where the system can polymerize monomers to polymer. For the purposes of this disclosure and the claims thereto, when catalyst systems are described as comprising neutral stable forms of the components, it is well understood by one of ordinary skill in the art, that the ionic form of the component is the form that reacts with the monomers to produce polymers.

An "anionic ligand" is a negatively charged ligand which donates one or more pairs of electrons to a metal ion. A "neutral donor ligand" is a neutrally charged ligand which donates one or more pairs of electrons to a metal ion.

A "scavenger" is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the catalyst compound to form an alkylated catalyst compound, also referred to as an alkylated disclosure compound.

A propylene polymer is a polymer having at least 50 mol % of propylene. As used herein, Mn is number average molecular weight as determined by proton nuclear magnetic resonance spectroscopy ($^1$H NMR) where the data is collected at 120° C. in a 5 mm probe using a spectrometer with a $^1H$ frequency of at least 400 MHz. Data is recorded using a maximum pulse width of 45° C., 8 seconds between pulses and signal averaging 120 transients. Unless stated otherwise, Mw is weight average molecular weight as determined by gel permeation chromatography (GPC), Mz is z average molecular weight as determined by GPC as described in the Vinyl Terminated Macromonomers section below, wt % is weight percent, and mol % is mole percent. Molecular weight distribution (MWD) is defined to be Mw (GPC) divided by Mn ($^1H$ NMR). Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL is triisobutyl n-octylaluminum, MAO is methylalumoxane, pMe is para-methyl, Ar* is 2,6-diisopropylaryl, Bz is benzyl, THF is tetrahydrofuran, RT is room temperature which is defined as 25° C. unless otherwise specified, and tol is toluene.

The term "phr" is parts per hundred rubber or "parts", and is a measure common in the art wherein components of a composition are measured by weight, relative to a total weight of all of the elastomer components. The total phr or parts for all rubber components, whether one, two, three, or more different rubber components is present in a given recipe is always defined as 100 phr. All other non-rubber components are ratioed by weight against the 100 parts of rubber and are expressed in phr. This way one can easily compare, for example, the levels of curatives or filler loadings, etc., between different compositions based on the same relative proportion of rubber without the need to recalculate percents for every component after adjusting levels of only one, or more, component(s).

DETAILED DESCRIPTION

All numerical values within the detailed description and the claims herein are modified by "about" or "approximately" the indicated value, and take into account experimental error and variations that would be expected by a person having ordinary skill in the art.

The present disclosure relates to fuel and lubricant dispersant products and their methods of preparation, lubricant compositions, methods of lubrication and products so lubricated. The dispersant products include amination products of an epoxidized vinyl terminated macromonomer (VTM) and an amino compound containing at least one —NH— group, and also epoxidation/amination products of a VTM and an amino compound containing at least one —NH— group. More particularly, the dispersant reaction products can be optionally reacted with boric acid or antioxidant, antiwear or anticorrosion molecules to obtain a multifunctional product having both dispersant and antioxidant properties, dispersant and antiwear properties, dispersant and anticorrosion properties, and the like.

This disclosure also relates to the synthesis of a new class of dispersants and dispersant viscosity index improvers based on VTMs, e.g., polypropylene, propylene-α-olefin or ethylene-α-olefin copolymers with terminal vinyl double bonds. The VTMs are chemically modified to obtain epoxide terminated polyolefins via epoxidation reaction of the VTM and epoxidizing agent. The polymer with terminal epoxide is reacted with polyamines to produce desired amine end product, i.e., dispersant. The resultant dispersant molecules, optionally can be reacted with boric acid, borate esters or with antiwear, anticorrosion, antioxidant molecules like 2,6-di-t-butylphenol, diphenylamine, phenylendiamine, 2,5-dimercapto-1,3,4-thiadiazole, benzotriazole, and tolyltriazole via formaldehyde coupling to obtain multifunctional dispersants (dispersant-antioxidant, dispersant-antiwear, and the like). Other molecules that can be reacted include, for example, antioxidants such as sulfurized phenols and non-sulfurized phenols, alkyl phenols, phenylamine, and the like, and corrosion inhibitors such as thiazines, thiadiazoles, thiophosphates, and the like.

In particular, this disclosure provides a new class of dispersants based on atactic polypropylene with a terminal vinyl double bond prepared by metallocene catalysts. These new dispersants broaden the formulation window to reach the fuel-efficient viscosity grades and/or facilitate the use of more readily available base oil of higher viscosity, thereby resulting in better overall performance. The epoxidation approach is attractive for vinyl terminated polyolefins because it is easier to epoxidize terminal vinyl double bond as compared to PIB with vinylidene or other unsaturation (internal, trisubstituted, and the like). Epoxidation potentially can be inexpensive via $H_2O_2$. Epoxidized polypropylene can be reacted with amines, including polyamines, resulting in a hydroxylamine linking group that is small but potent compared to the traditional succinamide group. The polyamine head or hydroxyl group can potentially can be further modified to obtain a multifunctional dispersant.

Dispersants

During engine operation, oil-insoluble oxidation byproducts are produced. Dispersants help keep these byproducts in solution, thus diminishing their deposition on metal surfaces. Dispersants may be ashless or ash-forming in nature. Preferably, the dispersant is ashless. So-called ashless dispersants are organic materials that form substantially no ash upon combustion. For example, non-metal-containing or borated metal-free dispersants are considered ashless. In contrast, metal-containing detergents discussed above form ash upon combustion.

In an embodiment, the dispersants of this disclosure can be prepared by an amination process comprising reacting an epoxidized VTM with an amino compound containing at least one —NH— group under amination conditions sufficient to give the dispersant.

In another embodiment, the dispersants of this disclosure can be prepared by an epoxidation/amination process comprising reacting a VTM with an epoxidizing agent under epoxidation conditions sufficient to give an epoxidized VTM intermediate, and reacting the epoxidized VTM intermediate with an amino compound containing at least one —NH— group under amination conditions sufficient to give the dispersant.

VTMs (e.g., allylic vinyl terminated polypropylene macromers) are epoxidized using an epoxidation catalyst to produce a terminally epoxidized macromer. Epoxidation of the VTMs can be affected using a peracid, such as performic acid, perbenzoic acid or m-chloroperbenzoic acid, as the oxidizing agent. Epoxidation of vinyl terminated polyolefin can be affected by the use of various peroxides and peracids. In the use of peracids, there are two possible procedures, namely, either the peracid is present throughout the reaction or alternatively the peracid is prepared in-situ during the reaction. Performic acid prepared in-situ, such as from formic acid and hydrogen peroxide, is very effective as an epoxidizing agent and can be used without a catalyst.

In accordance with this disclosure, the VTM is converted to the desired epoxidized intermediate product by reacting the VTM with a selected type of epoxidizing agent which is typically hydrogen peroxide. Hydrogen peroxide has the chemical formula $H_2O_2$ and is a strong oxidizing agent. It is a raw material which is readily commercially available in a variety of forms.

Hydrogen peroxide is preferably used in the epoxidation process in the form of an aqueous solution with a hydrogen peroxide content between 1 wt %-90 wt %, more preferably from 10 wt %-80 wt % and even more preferably from 30 wt %-70 wt %. The hydrogen peroxide may be used in the form of a commercially available, stabilized solution. Suitable sources of peroxide are unstabilized, aqueous hydrogen peroxide solutions such as are obtained in the anthraquinone process for producing hydrogen peroxide. Hydrogen peroxide solutions in methanol which are obtained by reacting hydrogen and oxygen in the presence of a noble metal catalyst in a methanol solvent may also be used.

A preformed peracid can be used to affect the epoxidation, or the peracid can be generated in-situ; for example, by the addition of formic acid and hydrogen peroxide to produce performic acid. Formic acid can be added in a molar ratio to the olefin double bonds of from 10:1 to 30:1. Hydrogen peroxide can be added to the reaction mixture in a molar ratio to the olefin double bonds of from 1.01:1 to 5:1. Addition of both formic acid and $H_2O_2$ to the reaction mixture results in the in-situ formation of performic acid as an epoxidizing agent. Typically, the epoxidation is conducted at a temperature ranging from 25° C.-100° C., preferably from 30° C.-70° C. Suitable reaction times will generally range from 0.1 hour to 36 hours, such as from 1 hour to 24 hours. Epoxidation reactions can provide conversion from 50 to 100% of the double bonds into oxirane groups.

The epoxidation reaction is generally carried out in a liquid reaction medium. The reaction medium can comprise only of the reactants essentially utilized in the process. More conventionally, however, the liquid reaction medium will comprise a suitable reaction solvent in which the reactants and catalyst materials can be dissolved, suspended or dispersed. Suitable reaction solvents include organic liquids which are inert in the reaction mixture. By "inert" is meant that the solvent does not deleteriously affect the oxidation reaction.

Suitable inert organic solvents include aromatic hydrocarbons such as benzene, toluene, xylenes, benzonitrile, nitrobenzene, and anisole; saturated aliphatic hydrocarbons having from 5 to 20 carbons, such as pentane, hexane, and heptane; adiponitrile; halogenated hydrocarbons such as methylene chloride, 1,2-dichloroethane, chloroform, carbon tetrachloride and the like; non-fluorinated, substituted saturated aliphatic and/or aromatic hydrocarbons having from 1 to 20 carbons, including those selected from the group consisting of alcohols such as methanol, propanol, butanol, isopropanol, and 2,4-di-t-butylphenol; ketones such as acetone; carboxylic acids such as propanoic acid and acetic acid; esters such as ethyl acetate, ethyl benzoate, dimethyl succinate, butyl acetate, tri-n-butyl phosphate, and dimethyl phthalate; ethers, such as tetraglyme; and mixtures thereof.

While peracid-based epoxidation is effective, there can be environmental and safety concerns associated with the use of peracids. Catalytic epoxidation alternatives using hydrogen peroxide as an oxidizing agent instead of peracids can be used to epoxidize some unsaturated materials. Catalysts based on the use of high valent ($d_o$), mostly Ti, V, Mo, W, and Re, metal complexes are known to promote alkene epoxidation with $H_2O_2$. Some notable effective epoxidation catalysts for use with hydrogen peroxide include titanium silicates, peroxophosphotungstates, manganese triazocyclononane, and methylrhenium trioxide. Generally, the alkyl group in the rhenium complex of such a catalyst will contain from 1 to 4 carbon atoms. Most preferably, this alkyl group will be methyl. Methyltrioxorhenium has the formula $CH_3ReO_3$.

Methyltrioxorhenium is hereinafter designated as "MTO". MTO is a known catalyst material which has been widely studied as an oxygen transfer reagent in oxidation reactions involving a variety of substrates. The important features of MTO as a catalyst include its ease of synthesis, its commercial availability and it stability to air. The MTO/$H_2O_2$ system involves nontoxic reagents. The oxidation and work-up procedures are relatively simple, and water is the only byproduct. Furthermore, MTO does not decompose $H_2O_2$ (unlike many transition metal-based catalysts). The MTO/$H_2O_2$ system has relatively high acidity, and such high acidity can promote hydrolysis of epoxidized products to hydroxylated, diol products.

Accordingly, when the epoxidized VTM is the desired reaction product, it may be appropriate to add one or more basic ligands to the MTO complex. Such basic ligands can, for example, be nitrogen-containing compounds such as ammonia or primary, secondary or tertiary amines including those described in U.S. Pat. No. 5,155,247, incorporated herein by reference. Such ligands can be reacted with the MTO complex prior to the introduction of the MTO-based catalyst into the reaction medium used in the process herein. Alternatively, ligand-forming compounds such as pyridine, bipyridine or other pyridine derivatives can be added to the reaction medium along with the reactants, MTO catalyst and reaction solvents. Use of an epoxidation catalyst can eliminate the need for the presence of large amounts of acidic reagents and can permit the use of a hydrogen peroxide oxidizing agent instead.

Epoxidation of a broad variety of alkenes, including polymers with double bonds, is in general known in the art. Representative prior art showing various procedures for epoxidizing a number of types of unsaturated materials includes Hafren et al., *Macromol. Rapid Commun.*, Vol. 26, pp. 82-86 (2005); Song et al., *J. Polym. Sci. Polym. Chem.*, Vol. 40, pp. 1484-1497 (2002); Shigenobu et al. (Maruzen Petrochemical); Japanese Patent Appln. No. JP2001-031716A, published Feb. 26, 2001; Suzuki et al., *Journal of Applied Polymer Science*, Vol. 72, pp. 103-108 (1999); and Li et al.; *Macromolecules*, Vol. 38, pp. 6767-6769 (2005).

Epoxidation of non-polymeric materials using catalysts or selected reaction medium solvents is also in general known in the art. Representative prior art references showing these kinds of expoxidation includes Hellmann et al., *Angew. Chem. Int. Ed. Engl.* Vol. 30, No. 12, pp. 1638-1641 (1991); Van Vliet et al., *Chem. Commun.*, pp. 821-822, (1999); and Neimann et al., *Org. Letters*, Vol. 2, No. 18, pp. 2861-2863 (2000).

A "vinyl terminated macromonomer," as used herein, refers to one or more of:

(i) a vinyl terminated polymer having at least 5% allyl chain ends (preferably 15%, 20%, 30%, 40%, 50%, 60%, 70%, 80%, 90%, 95%, 98%, or 99%);

(ii) a vinyl terminated polymer having an Mn of at least 200 g/mol (measured by $^1$H NMR) comprising of one or more $C_4$ to $C_{40}$ higher olefin derived units, where the higher olefin polymer comprises substantially no propylene derived units; and wherein the higher olefin polymer has at least 5% allyl chain ends;

(iii) a copolymer having an Mn of 300 g/mol or more (measured by $^1$H NMR) comprising (a) from 20 mol % to 99.9 mol % of at least one $C_5$ to $C_{40}$ higher olefin, and (b) from 0.1 mol % to 80 mol % of propylene, wherein the higher olefin copolymer has at least 40% allyl chain ends;

(iv) a copolymer having an Mn of 300 g/mol or more (measured by $^1$H NMR), and comprises (a) from 80 mol % to 99.9 mol % of at least one $C_4$ olefin, (b) from 0.1 mol % to 20 mol % of propylene; and wherein the vinyl terminated macromonomer has at least 40% allyl chain ends relative to total unsaturation;

(v) a co-oligomer having an Mn of 300 g/mol to 30,000 g/mol (measured by $^1$H NMR) comprising 10 mol % to 90 mol % propylene and 10 mol % to 90 mol % of ethylene, wherein the oligomer has at least X % allyl chain ends (relative to total unsaturations), where: 1) X=(−0.94*(mol % ethylene incorporated)+100), when 10 mol % to 60 mol % ethylene is present in the co-oligomer, 2) X=45, when greater than 60 mol % and less than 70 mol % ethylene is present in the co-oligomer, and 3) X=(1.83*(mol % ethylene incorporated)-83), when 70 mol % to 90 mol % ethylene is present in the co-oligomer;

(vi) a propylene oligomer, comprising more than 90 mol % propylene and less than 10 mol % ethylene wherein the oligomer has: at least 93% allyl chain ends, a number average molecular weight (Mn) of 500 g/mol to 20,000 g/mol, an isobutyl chain end to allylic vinyl group ratio of 0.8:1 to 1.35:1.0, and less than 100 ppm aluminum;

(vii) a propylene oligomer, comprising: at least 50 mol % propylene and from 10 mol % to 50 mol % ethylene, wherein the oligomer has: at least 90% allyl chain ends, an Mn of 150 g/mol to 10,000 g/mol, and an isobutyl chain end to allylic vinyl group ratio of 0.8:1 to 1.2:1.0, wherein monomers having four or more carbon atoms are present at from 0 mol % to 3 mol %;

(viii) a propylene oligomer, comprising: at least 50 mol % propylene, from 0.1 mol % to 45 mol % ethylene, and from 0.1 mol % to 5 mol % $C_4$ to $C_{12}$ olefin, wherein the oligomer has: at least 90% allyl chain ends, an Mn of 150 g/mol to 10,000 g/mol, and an isobutyl chain end to allylic vinyl group ratio of 0.8:1 to 1.35:1.0;

(ix) a propylene oligomer, comprising: at least 50 mol % propylene, from 0.1 mol % to 45 mol % ethylene, and from 0.1 mol % to 5 mol % diene, wherein the oligomer has: at least 90% allyl chain ends, an Mn of 150 g/mol to 10,000 g/mol, and an isobutyl chain end to allylic vinyl group ratio of 0.7:1 to 1.35:1.0; and (x) a homo-oligomer, comprising propylene, wherein the oligomer has: at least 93% allyl chain ends, an Mn of 500 g/mol to 20,000 g/mol, an isobutyl chain end to allylic vinyl group ratio of 0.8:1 to 1.2:1.0, and less than 1400 ppm aluminum.

In some embodiments, the vinyl terminated macromonomer has an Mn of at least 200 g/mol, (e.g., 200 g/mol to 100,000 g/mol, e.g., 200 g/mol to 75,000 g/mol, e.g., 200 g/mol to 60,000 g/mol, e.g., 300 g/mol to 60,000 g/mol, or e.g., 750 g/mol to 30,000 g/mol) (measured by $^1$H NMR) and comprise one or more (e.g., two or more, three or more, four or more, and the like) $C_4$ to $C_{40}$ (e.g., $C_4$ to $C_{30}$, $C_4$ to $C_{20}$, or $C_4$ to $C_{12}$, e.g., butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) olefin derived units, where the vinyl terminated macromonomer comprises substantially no propylene derived units (e.g., less than 0.1 wt % propylene, e.g., 0 wt %); and wherein the vinyl terminated macromonomer has at least 5% (at least 10%, at least 15%, at least 20%, at least 30%, at least 40%, at least 50%, at least 60%, at least 70%; at least 80%, at least 90%, or at least 95%) allyl chain ends (relative to total unsaturation); and optionally, an allyl chain end to vinylidene chain end ratio of 1:1 or greater (e.g., greater than 2:1, greater than 2.5:1, greater than 3:1, greater than 5:1, or greater than 10:1); and even further optionally, e.g., substantially no isobutyl chain ends (e.g., less than 0.1 wt % isobutyl chain ends). In some embodiments, the vinyl terminated macromonomers may also comprise ethylene derived units, e.g., at least 5 mol % ethylene (e.g., at least 15 mol % ethylene, e.g., at least 25 mol % ethylene, e.g., at least 35 mol % ethylene, e.g., at least 45 mol % ethylene, e.g., at least 60 mol % ethylene, e.g., at least 75 mol % ethylene, or e.g., at least 90 mol % ethylene). Such vinyl terminated macromonomers are further described in U.S. Ser. No. 13/072,288, which is hereby incorporated by reference.

In some embodiments, the vinyl terminated macromonomers may have an Mn (measured by $^1$H NMR) of greater than 200 g/mol (e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprise:

(a) from 20 mol % to 99.9 mol % (e.g., from 25 mol % to 90 mol % from 30 mol % to 85 mol %, from 35 mol % to 80 mol %, from 40 mol % to 75 mol %, or from 50 mol % to 95 mol %) of at least one $C_5$ to $C_{40}$ (e.g., $C_6$ to $C_{20}$) higher olefin; and (b) from 0.1 mol % to 80 mol % (e.g., from 5 mol % to 70 mol %, from 10 mol % to 65 mol %, from 15 mol % to 55 mol %, from 25 mol % to 50 mol %, or from 30 mol % to 80 mol %) of propylene;

wherein the vinyl terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation; and, optionally, an isobutyl chain end to allyl chain end ratio of less than 0.70:1, less than 0.65:1, less than 0.60:1, less than 0.50:1, or less than 0.25:1; and further optionally, an allyl chain end to vinylidene chain end ratio of greater than 2:1 (e.g., greater than 2.5:1, greater than 3:1, greater than 5:1, or greater than 10:1); and even further optionally, an allyl chain end to vinylene ratio is greater than 1:1 (e.g., greater than 2:1 or greater than 5:1). Such macromonomers are further described in U.S. Ser. No. 13/072,249, hereby incorporated by reference.

In another embodiment, the vinyl terminated macromonomer has an Mn of 300 g/mol or more (measured by $^1$H NMR, e.g., 300 g/mol to 60,000 g/mol, 400 g/mol to 50,000 g/mol, 500 g/mol to 35,000 g/mol, 300 g/mol to 15,000 g/mol, 400 g/mol to 12,000 g/mol, or 750 g/mol to 10,000 g/mol), and comprises:

(a) from 80 mol % to 99.9 mol % of at least one $C_4$ olefin, e.g., 85 mol % to 99.9 mol %, e.g., 90 mol % to 99.9 mol %;

(b) from 0.1 mol % to 20 mol % of propylene, e.g., 0.1 mol % to 15 mol %, e.g., 0.1 mol % to 10 mol %; and wherein the vinyl terminated macromonomer has at least 40% allyl chain ends (e.g., at least 50% allyl chain ends, at least 60% allyl chain ends, at least 70% allyl chain ends, or at least 80% allyl chain ends, at least 90% allyl chain ends, at least 95% allyl chain ends) relative to total unsaturation, and in some embodiments, an isobutyl chain end to allyl chain end ratio of less than 0.70:1, less than 0.65:1, less than 0.60:1, less than 0.50:1, or less than 0.25:1, and in further embodiments, an allyl chain end to vinylidene group ratio of more than 2:1, more than 2.5:1, more than 3:1, more than 5:1, or more than 10:1. Such macromonomers are also further described in U.S. Ser. No. 13/072,249, which is hereby incorporated by reference.

In other embodiments, the vinyl terminated macromonomer is a propylene co-oligomer having an Mn of 300 g/mol to 30,000 g/mol as measured by $^1$H NMR (e.g., 400 g/mol to 20,000 g/mol, e.g., 500 g/mol to 15,000 g/mol, e.g., 600 g/mol to 12,000 g/mol, e.g., 800 g/mol to 10,000 g/mol, e.g., 900 g/mol to 8,000 g/mol, e.g., 900 g/mol to 7.000 g/mol), comprising 10 mol % to 90 mol % propylene (e.g., 15 mol % to 85 mol %. e.g., 20 mol % to 80 mol %, e.g., 30 mol % to 75 mol %, e.g., 50 mol % to 90 mol %) and 10 mol % to 90 mol % (e.g., 85 mol % to 15 mol %, e.g., 20 mol % to 80 mol %, e.g., 25 mol % 25 to 70 mol %, e.g., 10 mol % to 50 mol %) of one or more alpha-olefin comonomers (e.g., ethylene, butene, hexene, or octene, e.g., ethylene), wherein the oligomer has at least X % allyl chain ends (relative to total unsaturations), where: 1) X=(−0.94 (mol % ethylene incorporated)+100{alternately 1.20 (−0.94 (mol % ethylene incorporated)+100), alternately 1.50 (−0.94 (mol % ethylene incorporated)+100)}), when 10 mol % to 60 mol % ethylene is present in the co-oligomer, 2) X=45 (alternately 50, alternately 60), when greater than 60 mol % and less than 70 mol % ethylene is present in the co-oligomer, and 3) X=(1.83*(mol % ethylene incorporated)−83, {alternately 1.20 [1.83*(mol % ethylene incorporated)−83], alternately 1.50 [1.83*(mol % ethylene incorporated)−83]}), when 70 mol % to 90 mol % ethylene is present in the co-oligomer. Such macromonomers are further described in U.S. Ser. No. 12/143,663, which is hereby incorporated by reference.

In other embodiments, the vinyl terminated macromonomer is a propylene oligomer, comprising more than 90 mol % propylene (e.g., 95 mol % to 99 mol %, e.g., 98 mol % to 9 mol %) and less than 10 mol % ethylene (e.g., 1 mol % to 4 mol %, e.g., 1 mol % 10 to 2 mol %), wherein the oligomer has: at least 93% allyl chain ends (e.g., at least 95%, e.g., at least 97%, e.g., at least 98%); a number average molecular weight (Mn) of 400 g/mol to 30,000 g/mol, as measured by $^1$H NMR (e.g., 500 g/mol to 20,000 g/mol, e.g., 600 g/mol to 15,000 g/mol, e.g., 700 g/mol to 10,000 g/mol, e.g., 800 g/mol to 9,000 g/mol, e.g., 900 g/mol to 8,000 g/mol, e.g., 1,000 g/mol to 6,000 g/mol); an isobutyl chain end to allylic vinyl group ratio of 0.8:1 to 1.35:1.0, and less than 1400 ppm aluminum, (e.g., less than 1200 ppm, e.g., less than 1000 ppm, e.g., less than 500 ppm, e.g., less than 100 ppm). Such macromonomers are further described in U.S. Ser. No. 12/143,663.

In other embodiments, the vinyl terminated macromonomer is a propylene oligomer, comprising: at least 50 mol % (e.g., 60 mol % to 90 mol %, e.g., 70 mol % to 90 mol %) propylene and from 10 mol % to 50 mol % (e.g., 10 mol % to 40 mol %, e.g., 10 mol % to 30 mol %) ethylene, wherein the oligomer has: at least 90% allyl chain ends (e.g., at least 91%, e.g., at least 93%, e.g., at least 95%, e.g., at least 98%); an Mn of 150 g/mol to 20,000 g/mol, as measured by $^1$H NMR (e.g., 200 g/mol to 15,000 g/mol, e.g., 250 g/mol to 15,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.8:1 to 1.3:1.0, wherein monomers having four or more carbon atoms are present at from 0 mol % to 3 mol % (e.g., at less than 1 mol %. e.g., less than 0.5 mol %, e.g., at 0 mol %). Such macromonomers are further described in U.S. Ser. No. 12/143,663.

In other embodiments, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %. e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) $C_4$ to $C_{12}$ olefin (such as butene, hexene, or octene, e.g., butene), wherein the oligomer has: at least 90% allyl chain ends (e.g., at least 91%, e.g., at least 93%, e.g., at least 95%, e.g., at least 98%); a number average molecular weight (Mn) of 150 g/mol to 15,000 g/mol, as measured by $^1$H NMR (e.g., 200 g/mol to 12,000 g/mol, e.g., 250 g/mol to 10,000 g/mol, e.g., 300 g/mol to 10,000 g/mol, e.g., 400 g/mol to 9500 g/mol, e.g., 500 g/mol to 9,000 g/mol, e.g., 750 g/mol to 9,000 g/mol); and an isobutyl chain end to allylic vinyl group ratio of 0.8:1 to 1.35:1.0. Such macromonomers are further described in U.S. Ser. No. 12/143,663.

In other embodiments, the vinyl terminated macromonomer is a propylene oligomer, comprising: at least 50 mol % (e.g., at least 60 mol %, e.g., 70 mol % to 99.5 mol %, e.g., 80 mol % to 99 mol %, e.g., 90 mol % to 98.5 mol %) propylene, from 0.1 mol % to 45 mol % (e.g., at least 35 mol %, e.g., 0.5 mol % to 30 mol %, e.g., 1 mol % to 20 mol %, e.g., 1.5 mol % to 10 mol %) ethylene, and from 0.1 mol % to 5 mol % (e.g., 0.5 mol % to 3 mol %, e.g., 0.5 mol % to 1 mol %) diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the oligomer has at least 90% allyl chain ends (e.g., at least 91%, e.g., at least 93%, e.g., at least 95%, e.g., at least 98%); a number average molecular weight (Mn) of 150 g/mol to 20,000 g/mol, as measured by $^1$H NMR (e.g., 200 g/mol to 15,000 g/mol, e.g., 250 g/mol to 12,000 g/mol, e.g., 300 g/mol to 10,000 g/mol, e.g., 400 g/mol to 9,500 g/mol, e.g., 500 g/mol to 9,000 g/mol, e.g., 750 g/mol to 9,000 g/mol); and an isobutyl chain end to allylic vinyl group ratio of 0.7:1 to 1.35:1.0. Such macromonomers are further described in U.S. Ser. No. 12/143,663.

In other embodiments, the vinyl terminated macromonomer is a propylene homo-oligomer, comprising propylene and less than 0.5 wt % comonomer, e.g., 0 wt % comonomer, wherein the oligomer has:

i) at least 93% allyl chain ends (e.g., at least 95%, e.g., at least 96%, e.g., at least 97%, e.g., at least 98%, e.g., at least 99%);

ii) a number average molecular weight (Mn) of 500 g/mol to 20,000 g/mol, as measured by $^1$H NMR (e.g., 500 g/mol to 15,000 g/mol, e.g., 700 g/mol to 10,000 g/mol, e.g., 800 g/mol to 8,000 g/mol, e.g., 900 g/mol to 7,000 g/mol, e.g., 1,000 g/mol to 6,000 g/mol, e.g., 1,000 g/mol to 5,000 g/mol);

iii) an isobutyl chain end to allylic vinyl group ratio of 0.8:1 to 1.3:1.0; and iv) less than 1400 ppm aluminum, (e.g., less than 1200 ppm, e.g., less than 1000 ppm, e.g., less than 500 ppm, e.g., less than 100 ppm). Such macromonomers are also further described in U.S. Ser. No. 12/143,663.

The vinyl terminated macromonomers may be homopolymers, copolymers, terpolymers, and so on. Any vinyl terminated macromonomers described herein has one or more of:

(i) an isobutyl chain end to allylic vinyl group ratio of 0.8:1 to 1.3:1.0;

(ii) an allyl chain end to vinylidene chain end ratio of greater than 2:1 (e.g., greater than 2.5:1, greater than 3:1, greater than 5:1, or greater than 10:1);

(iii) an allyl chain end to vinylene ratio is greater than 1:1 (e.g., greater than 2:1 or greater than 5:1); and (iv) at least 5% allyl chain ends (preferably 15%, 20%, 30%, 40%, 50%, 60%, 700%, 80%, 90%, 95%, 98%, or 99%).

Vinyl terminated macromonomers generally have a saturated chain end (or terminus) and/or an unsaturated chain end or terminus. The unsaturated chain end of the vinyl terminated macromonomer comprises an "allyl chain end" or a "3-alkyl" chain end. An allyl chain end is represented by $CH_2CH=CH_2$—, as shown in the formula:

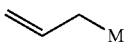

where M represents the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1H$ NMR at 120° C. using deuterated tetrachloroethane as the solvent on an at least 250 MHz NMR spectrometer, and in selected cases, confirmed by $^{13}C$ NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a BRUKER spectrometer operating at 500 MHz for proton and 125 MHz for carbon) for vinyl terminated oligomers in *J. American Chemical Soc.*, 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A 3-alkyl chain end (where the alkyl is a $C_1$ to $C_{38}$ alkyl), also referred to as a "3-alkyl vinyl end group" or a "3-alkyl vinyl termination", is represented by the formula:

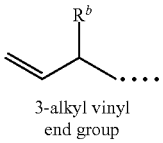

3-alkyl vinyl
end group where "••••" represents the polyolefin chain and $R^b$ is a $C_1$ to $C_{38}$ alkyl group, or a $C_1$ to $C_{20}$ alkyl group, such as methyl, ethyl, propyl, butyl, pentyl, hexyl, heptyl, octyl, nonyl, decyl, undecyl, dodecyl, and the like. The amount of 3-alkyl chain ends is determined using $^{13}C$ NMR as set out below.

$^{13}C$ NMR data is collected at 120° C. at a frequency of at least 100 MHz, using a BRUKER 400 MHz NMR spectrometer. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired with time averaging to provide a signal to noise level adequate to measure the signals of interest. Samples are dissolved in tetrachloroethane-$d_2$ at concentrations between 10 wt % to 15 wt % prior to being inserted into the spectrometer magnet. Prior to data analysis spectra are referenced by setting the chemical shift of the TCE solvent signal to 74.39 ppm. Chain ends for quantization were identified using the signals shown in the table below. N-butyl and n-propyl were not reported due to their low abundance (less than 5%) relative to the chain ends shown in the table below.

| Chain End | $^{13}C$ NMR Chemical Shift |
|---|---|
| P~i-Bu | 23-5 to 25.5 and 25.8 to 26.3 ppm |
| E~i-Bu | 39.5 to 40.2 ppm |

-continued

| Chain End | $^{13}C$ NMR Chemical Shift |
|---|---|
| P~Vinyl | 41.5 to 43 ppm |
| E~Vinyl | 33.9 to 34.4 ppm |

The "allyl chain end to vinylidene chain end ratio" is defined to be the ratio of the percentage of allyl chain ends to the percentage of vinylidene chain ends. The "allyl chain end to vinylene chain end ratio" is defined to be the ratio of the percentage of allyl chain ends to the percentage of vinylene chain ends. Vinyl terminated macromonomers typically also have a saturated chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

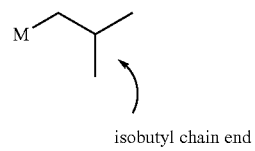

isobutyl chain end where M represents the polymer chain. Isobutyl chain ends are determined according to the procedure set out in WO 2009/155471. The "isobutyl chain end to allylic vinyl group ratio" is defined to be the ratio of the percentage of isobutyl chain ends to the percentage of allyl chain ends.

In polymerizations comprising $C_4$ or greater monomers (or "higher olefin" monomers), the saturated chain end may be a $C_4$ or greater (or "higher olefin") chain end, as shown in the formula below:

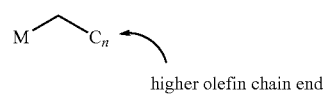

higher olefin chain end where M represents the polymer chain and n is an integer selected from 4 to 40. This is especially true when there is substantially no ethylene or propylene in the polymerization. In an ethylene/($C_4$ or greater monomer) copolymerization, the polymer chain may initiate growth in an ethylene monomer, thereby generating a saturated chain end which is an ethyl chain end. Mn ($^1H$ NMR) is determined according to the following NMR method. $^1H$ NMR data is collected at either room temperature or 120° C. (for purposes of the claims, 120° C. shall be used) in a 5 mm probe using a Varian spectrometer with a $^1H$ frequency of 250 MHz, 400 MHz, or 500 MHz (for the purpose of the claims, a proton frequency of 400 MHz is used). Data are recorded using a maximum pulse width of 45° C., 8 seconds between pulses and signal averaging 120 transients. Spectral signals are integrated and the number of unsaturation types per 1000 carbons is calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene (VYD) | 4.70-4.84 | 2 |
| Vinylene | 5.31-5.55 | 2 |
| Trisubstituted | 5.11-5.30 | 1 |

Mn may also be determined using a GPC-DRI method, as described below. For the purpose of the claims, Mn is determined by $^1$H NMR. Mn, Mw, and Mz may be measured by using a Gel Permeation Chromatography (GPC) method using a High Temperature Size Exclusion Chromatograph (SEC, either from Waters Corporation or Polymer Laboratories), equipped with a differential refractive index detector (DRI). Experimental details, are described in: T. Sun, P. Brant, R. R. Chance, and W. W. Graessley, *Macromolecules*, Volume 34, Number 19, pp. 6812-6820, (2001) and references therein. Three Polymer Laboratories PLgel 10 mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for 2 hours. All quantities are measured gravimetrically. The TCB densities used to express the polymer concentration in mass/volume units are 1.463 g/mL at room temperature and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and X=690 nm. For purposes of this disclosure and the claims thereto, (dn/dc)=0.104 for propylene polymers and ethylene polymers, and 0.1 otherwise. Units of parameters used throughout this description of the SEC method are: concentration is expressed in g/cm$^3$, molecular weight is expressed in g/mol, and intrinsic viscosity is expressed in dL/g.

In an embodiment, the polyolefin is derived from a vinyl terminated propylene polymer. In an embodiment, the vinyl terminated propylene polymer is produced using a process comprising: contacting propylene, under polymerization conditions, with a catalyst system comprising an activator and at least one metallocene compound represented by the formula:

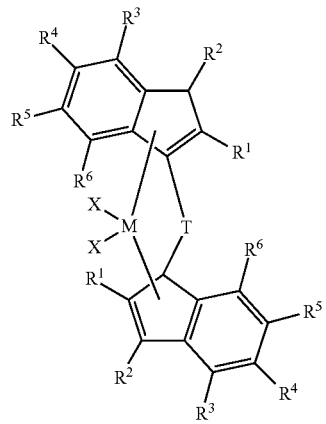

where:
M is hafnium or zirconium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each R$^1$ is, independently, a C$_1$ to C$_{10}$ alkyl group;
each R$^2$ is, independently, a C$_1$ to C$_{10}$ alkyl group;
each R$^3$ is hydrogen;
each R$^4$, R$^5$, and R$^6$, is, independently, hydrogen or a substituted hydrocarbyl or unsubstituted hydrocarbyl group, or a heteroatom;
T is a bridging group; and
further provided that any of adjacent R$^4$, R$^5$, and R$^6$ groups may form a fused ring or multicenter fused ring system where the rings may be aromatic, partially saturated or saturated; and
obtaining a propylene polymer having at least 50% allyl chain ends (relative to total unsaturations), as described in co-pending U.S. Ser. No. 13/072,280, filed Mar. 25, 2011, which is incorporated by reference in its entirety herein.

In an embodiment, the vinyl terminated propylene polymer is produced using a process comprising:
1) contacting:
   a) one or more olefins with

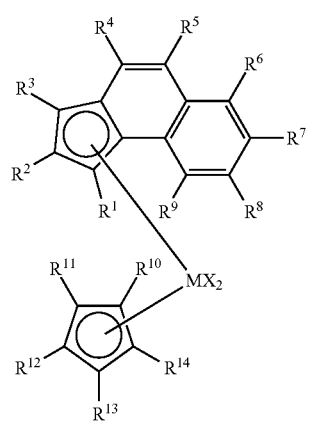

b) a transition metal catalyst compound represented by the formula:
wherein
M is hafnium or zirconium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof;
each $R^1$ and $R^3$ are, independently, a $C_1$ to $C_8$ alkyl group; and each $R^2$, $R^4$, $R^5$, $R^6$, $R^7$, $R^8$, $R^9$, $R^{10}$, $R^{11}$, $R^{12}$, $R^{13}$, and $R^{14}$ are, independently, hydrogen, or a substituted or unsubstituted hydrocarbyl group having from 1 to 8 carbon atoms, provided however that at least three of the $R^{10}$-$R^{14}$ groups are not hydrogen; and 2) obtaining vinyl terminated polymer having an Mn of 300 g/mol or more and at least 30% allyl chain ends (relative to total unsaturation), as described in co-pending U.S. Ser. No. 13/072,279, filed Mar. 25, 2011, which is incorporated by reference in its entirety herein.

In an embodiment, the polyolefin chain is derived from a higher olefin copolymer comprising allyl chain ends. In an embodiment, the higher olefin copolymer comprising allyl chain ends has an Mn of 300 g/mol or more (measured by $^1$H NMR) comprising:
(i) from 20 to 99.9 mol % of at least one $C_5$ to $C_{40}$ higher olefin; and
(ii) from 0.1 mol % to 80 mol % of propylene;
wherein the higher olefin copolymer has at least 40% allyl chain ends, as described in U.S. Ser. No. 13/072,249, filed Mar. 25, 2011, which is incorporated by reference in its entirety herein.

In an embodiment, the polyolefin chain is derived from a vinyl terminated branched polyolefin. In an embodiment, the vinyl terminated branched polyolefin has an Mn ($^1$H NMR) of 7,500 to 60,000 g/mol, comprising one or more alpha olefin derived units comprising ethylene and/or propylene, and having;
(i) 50% or greater allyl chain ends, relative to total number of unsaturated chain ends; and
(ii) a $g'_{vis}$ of 0.90 or less, as described in U.S. Ser. No. 61/467,681, filed Mar. 25, 2011, which is incorporated by reference in its entirety herein.

In an embodiment, the polyolefin chain is derived from a vinyl terminated branched polyolefin produced by a process for polymerization, comprising:
(i) contacting, at a temperature greater than 35° C., one or more monomers comprising ethylene and/or propylene, with a catalyst system comprising a metallocene catalyst compound and an activator, wherein the metallocene catalyst compound is represented by the following formula:

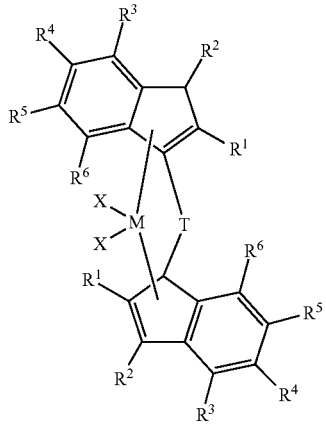

where: M is selected from the group consisting of zirconium or hafnium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each $R^1$, $R^2$, $R^3$, $R^4$, $R^5$, and $R^6$, is, independently, hydrogen or a substituted or unsubstituted hydrocarbyl group, a heteroatom or heteroatom containing group;
further provided that any two adjacent R groups may form a fused ring or multicenter fused ring system where the rings may be aromatic, partially saturated or saturated;
further provided that any of adjacent $R^4$, $R^5$, and $R^6$ groups may form a fused ring or multicenter fused ring system where the rings may be aromatic, partially saturated or saturated;
T is a bridging group represented by the formula $(Ra)_2J$, where J is one or more of C, Si, Ge, N or P, and each Ra is, independently, hydrogen, halogen, $C_1$ to $C_{20}$ hydrocarbyl or a $C_1$ to $C_{20}$ substituted hydrocarbyl, provided that at least one $R^3$ is a substituted or unsubstituted phenyl group, if any of $R^1$, $R^2$, $R^4$, $R^5$, or $R^6$ are not hydrogen;
(ii) converting at least 50 mol % of the monomer to polyolefin; and
(iii) obtaining a branched polyolefinn having greater than 50% allyl chain ends, relative to total unsaturated chain ends and a Tm of 60° C. or more, as described in U.S. Ser. No. 61,467,681, filed Mar. 25, 2011, which is incorporated by reference in its entirety herein.

As described herein, the epoxidation reaction can be carried out by conventional methods known in the art. Reaction conditions for the epoxidation reaction of the VTM, such as temperature, pressure and contact time, may also vary greatly and any suitable combination of such conditions may be employed herein. The reaction temperature may range between 25° C. to 250° C., and preferably between 30° C. to 200° C., and more preferably between 60° C. to 150° C. Normally the reaction is carried out under ambient pressure and the contact time may vary from a matter of seconds or minutes to a few hours or greater. The reactants can be added to the reaction mixture or combined in any order. The stir time employed can range from 0.5 to 48 hours, preferably from 1 to 36 hours, and more preferably from 2 to 24 hours.

Illustrative epoxidized VTMs useful in this disclosure include, for example, those corresponding to the particular VTMs that undergo epoxidation. Suitable epoxidized VTMs include, for example, epoxidized VTMs prepared from polypropylene, propylene-α-olefin or ethylene-α-olefin copolymers with terminal vinyl double bonds, and the like. In particular, suitable epoxidized VTMs include, for example, epoxidized isotactic or atatic polypropylene having an average MW between 500 and 5000, preferably between 1000 and 2000, and the like.

The amino compound useful in this disclosure is characterized by the presence within its structure of at least one —NH— group can be a monoamine or polyamine compound. For purposes of this disclosure, hydrazine and substituted hydrazines containing up to three substituents are included as amino compounds suitable for preparing dispersant compositions. Mixtures of two or more amino compounds can be used in the reaction with one or more epoxidized VTM reagents of this disclosure. Preferably, the amino compound contains at least one primary amino group (i.e., —NH$_2$) and more preferably the amine is a polyamine, especially a polyamine containing at least two —NH— groups, either or both of which are primary or secondary amines. The polyamines not only result in dispersant compositions derived from monoamines, but these preferred polyamines result in dispersant compositions which exhibit more pronounced viscosity index (VI) improving properties.

The monoamines and polyamines are characterized by the presence within their structure of at least one —NH— group. Therefore, they have at least one primary (i.e., $H_2N$—) or secondary amino (i.e., H—N=) group. The amines can be aliphatic, cycloaliphatic, aromatic, or heterocyclic, including aliphatic-substituted cycloaliphatic, aliphatic-substituted aromatic, aliphatic-substituted heterocyclic, cycloaliphatic-substituted aliphatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted alicyclic, and heterocyclic-substituted aromatic amines and may be saturated or unsaturated. If unsaturated, the amine will be free from acetylenic unsaturation. The amines may also contain non-hydrocarbon substituents or groups as long as these groups do not significantly interfere with the reaction of the amines with the epoxidized VTM reagents of this disclosure. Such non-hydrocarbon substituents or groups include lower alkoxy, lower alkyl mercapto, nitro, interrupting groups such as —O— and —S— (e.g., as in such groups as —$CH_2CH_2$—$XCH_2CH_2$— where X is —O— or —S—).

With the exception of the branched polyalkylene polyamine, the polyoxyalkylene polyamines, and the high molecular weight hydrocarbyl-substituted amines described more fully hereafter, the amines ordinarily contain less than 40 carbon atoms in total and usually not more than 20 carbon atoms in total.

Aliphatic monoamines include mono-aliphatic and di-aliphatic substituted amines wherein the aliphatic groups can be saturated or unsaturated and straight or branched chain. Thus, they are primary or secondary aliphatic amines. Such amines include, for example, mono- and di-alkyl-substituted amines, mono and di-alkenyl-substituted amines, and amines having one N-alkenyl substituent and one N-alkyl substituent and the like. The total number of carbon atoms in these aliphatic monoamines will, as mentioned before, normally will not exceed 40 and usually not exceed 20 carbon atoms. Specific examples of such monoamines include ethylamine, diethylamine, n-butylamine, di-n-butylamine, allylamine, isobutylamine, cocoamine, stearylamine, laurylamine, methyllaurylamine, oleylamine, N-methyl-octylamine, dodecyl amine, octadecylamine, and the like. Examples of cycloaliphatic-substituted aliphatic amines, aromatic substituted aliphatic amines, and heterocyclic-substituted aliphatic amines, include 2-(cyclohexyl)-ethylamine, benzylamine, phenethylamine, and 3-(furylpropyl)amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentylamines, N-ethyl-cyclohexylamine, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines, and pyranyl-substituted cyclohexylamine.

Aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthalene. Examples of aromatic monoamines include aniline, di(para-methylphenyl)amine, naphthylamine, N-(n-butyl)aniline, and the like. Examples of aliphatic-substituted, cycloaliphatic-substituted, and heterocyclic-substituted aromatic monoamines are para-ethoxyaniline, para-dodecylaniline, cyclohexylsubstituted naphthylamine, and thienyl-substituted aniline.

Polyamines are aliphatic, cycloaliphatic and aromatic polyamines analogous to the above-described monoamines except for the presence within their structure of another amino nitrogen. The other amino nitrogen can be a primary, secondary or tertiary amino nitrogen. Examples of such polyamines include N-aminopropyl-cyclohexylamines, N,N'-di-n-butyl-para-phenylene diamine, bis-(para-aminophenyl)methane, 1,4-diaminocyclohexane, and the like.

Heterocyclic monoamines and polyamines can also be used in making the dispersant compositions of this disclosure. As used herein, the terminology "heterocyclic mono- and polyamine(s)" is intended to describe those heterocyclic amines containing at least one primary or secondary amino group and at least one nitrogen as a heteroatom in the heterocyclic ring. However, as long as there is present in the heterocyclic-mono- and polyamines at least one primary or secondary amino group, the hetero-N atom in the ring can be a tertiary amino nitrogen; that is, one that does not have hydrogen attached directly to the ring nitrogen. Heterocyclic amines can be saturated or unsaturated and can contain various substituents such as nitro, alkoxy, alkyl mercapto, alkyl, alkenyl, aryl, alkaryl, or aralkyl substituents. Generally, the total number of carbon atoms in the substituents will not exceed 20. Heterocyclic amines can contain hetero atoms other than nitrogen, especially oxygen and sulfur. Obviously they can contain more than one nitrogen hetero atom. The five- and six-membered heterocyclic rings are preferred.

Among the suitable heterocyclics are aziridines, azetidines, azolidines, tetra- and di-hydro pyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-di-aminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkylsubstituted piperidines, piperazine, aminoalkylsubstituted morpholines, pyrrolidine, and aminoalkylsubstituted pyrrolidines, are especially preferred. Usually the aminoalkyl substituents are substituted on a nitrogen atom forming part of the hetero ring. Specific examples of such heterocyclic amines include N-aminopropylmorpholine, N-amnoethylpiperazine, and N,N-di-aminoethylpiperazine.

Hydroxyamines both mono- and polyamines, analogous to those described above are also useful as (a) provided they contain at least one primary or secondary amino group. Hydroxy-substituted amines having only tertiary amino nitrogen such as in tri-hydroxyethyl amine, are thus excluded as (a) (but can be used as (b) as disclosed hereafter). The hydroxy-substituted amines contemplated are those having hydroxy substituents bonded directly to a carbon atom other than a carbonyl carbon atom; that is, they have hydroxy groups capable of functioning as alcohols. Examples of such hydroxy-substituted amines include ethanolamine, di-(3-hydroxypropyl)-amine, 3-hydroxybutyl-amine, 4-hydroxybutyl-amine, diethanolamine, di-(2-hydroxypropyl)-amine, N-(hydroxypropyl) propylamine, N-(2-hydroxyethyl)-cyclohexylamine, 3-hydroxycyclopentylamine, para-hydroxyaniline, N-hydroxyethyl piperazine, and the like.

Hydrazine and substituted-hydrazine can also be used. At least one of the nitrogens in the hydrazine must contain a hydrogen directly bonded thereto. Preferably there are at least two hydrogens bonded directly to hydrazine nitrogen and, more preferably, both hydrogens are on the same nitrogen. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy substituted phenyl or lower alkyl substituted phenyl. Specific examples of substituted hydrazines are methylhydrazine, N,N-dimethyl-hydrazine, N,N'-dimethylhydrazine, phenylhydrazine, N-phenyl-N'-ethylhydrazine. N-(para-tolyl)-N'-(n-butyl)-hydrazine, N-(para-nitrophenyl)-hydrazine, N-(para-nitrophenyl) N-methyl-hydrazine, N,N'-di(para-chlorophenol)-hydrazine, N-phenyl-N'-cyclohexylhydrazine, and the like.

The high molecular weight hydrocarbyl amines, both mono-amines and polyamines, which can be used as (a) are generally prepared by reacting a chlorinated polyolefin having a molecular weight of at least 400 with ammonia or amine. Such amines are known in the art and described, for example, in U.S. Pat. Nos. 3,275,554 and 3,438,757, both of which are expressly incorporated herein by reference for their disclosure in regard to how to prepare these amines. All that is required for use of these amines is that they possess at least one primary or secondary amino group.

Another group of amines suitable for use are branched polyalkylene polyamines. The branched polyalkylene polyamines are polyalkylene polyamines wherein the branched group is a side chain containing on the average at least one nitrogen-bonded aminoalkylene (i.e., $NH_2$—R—[NH—R]$_x$)

group per nine amino units present on the main chain, for example, 1-4 of such branched chains per nine units on the main chain units. Thus, these polyamines contain at least three primary amino groups and at least one tertiary amino group.

Suitable amines also include polyoxyalkylene polyamines, e.g., polyoxyalkylene diamines and polyoxyalkylene triamines, having average molecular weights ranging from 200 to 4000 and preferably from 400 to 2000. Illustrative examples of these polyoxyalkylene polyamines may be characterized by the formulae $NH_2$-Alkylene-(O-Alkylene)$_m$-$NH_2$ wherein m has a value of 3 to 70 and preferably 10 to 35.

R-(Alkylene-(O-Alkylene)$_n$-$NH_2$)$_{3-6}$ wherein n is such that the total value is from 1 to 40 with the proviso that the sum of all of the n's is from 3 to 70 and generally from 6 to 35 and R is a polyvalent saturated hydrocarbon radical of up to 10 carbon atoms having a valence of 3 to 6. The alkylene groups may be straight or branched chains and contain from 1 to 7 carbon atoms and usually from 1 to 4 carbon atoms. The various alkylene groups present within formulae (VI) and (VII) may be the same or different.

The preferred polyoxyalkylene polyamines include the polyoxyethylene and polyoxypropylene diamines and the polyoxypropylene triamines having average molecular weights ranging from 200 to 2000. The polyoxyalkylene polyamines are commercially available and may be obtained, for example, from the Jefferson Chemical Company, Inc. under the trade name "Jeffamines D-230, D-400, D-1000, D-2000, T-403".

The most preferred amines are the alkylene polyamines, including the polyalkylene polyamines, as described in more detail hereafter. The alkylene polyamines include those conforming to the formula $R_3$—$N(R_3)$—$(U$—$N(R_3))_n$—$R_3$ wherein n is from 1 to 10; each $R_3$ is independently a hydrogen atom, a hydrocarbyl group or a hydroxy-substituted hydrocarbyl group having up to 30 atoms, with the proviso that at least one $R_3$ group is a hydrogen atom and u is an alkylene group of 2 to 10 carbon atoms. Preferably u is ethylene or propylene. Especially preferred are the alkylene polyamines where each $R_3$ is hydrogen with the ethylene polyamines and mixtures of ethylene polyamines being the most preferred. Usually n will have an average value of from 2 to 7. Such alkylene polyamines include methylene polyamine, ethylene polyamines, butylene polyamines, propylene polyamines, pentylene polyamines, hexylene polyamines, heptylene polyamines, and the like. The higher homologs of such amines and related amino alkyl-substituted piperazines are also included.

Alkylene polyamines useful in preparing the dispersant compositions include ethylene diamine, triethylene tetramine, propylene diamine, trimethylene diamine, hexamethylene diamine, decamethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, N-(2-aminoethyl)piperazine, 1,4-bis(2, aminoethyl)piperazine, and the like. Higher homologs as are obtained by condensing two or more of the above-illustrated alkylene amines are useful as (a) as are mixtures of two or more of any of the afore-described polyamines.

Ethylene polyamines, such as those mentioned above, are especially useful for reasons of cost and effectiveness. Such polyamines are described in detail under the heading "Diamines and Higher Amines" in The Encyclopedia of Chemical Technology, Second Edition, Kirk and Othmer, Volume 7, pages 27-39, Interscience Publishers, Division of John Wiley and Sons, 1965, which is hereby incorporated by reference for the disclosure of useful polyamines. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Other useful types of polyamine mixtures are those resulting from stripping of the above-described polyamine mixtures. In this instance, lower molecular weight polyamines and volatile contaminants are removed from an alkylene polyamine mixture to leave as residue what is often termed "polyamine bottoms". In general, alkylene polyamine bottoms can be characterized as having less than two, usually less than one percent (by weight) material boiling below 200° C. In the instance of ethylene polyamine bottoms, which are readily available and found to be quite useful, the bottoms contain less than two percent (by weight) total diethylene triamine (DETA) or triethylene tetramine (TETA). A typical sample of such ethylene polyamine bottoms obtained from the Dow Chemical Company of Freeport, Tex. designated "E-100" showed a specific gravity at 15.6° C. of 1.0168, a percent nitrogen by weight of 33.15 and a viscosity at 40° C.

of 121 centistokes. Gas chromatography analysis of such a sample showed it to contain 0.93% "Light Ends" (DETA), 0.72% TETA, 21.74% tetraethylene pentamine and 76.61% pentaethylene hexamine and higher (by weight). These alkylene polyamine bottoms include cyclic condensation products such as piperazine and higher analogs of diethylene triamine, triethylene tetramine and the like.

These alkylene polyamine bottoms can be reacted solely with the epoxidizing agent, in which case the amino reactant consists essentially of alkylene polyamine bottoms, or they can be used with other amines and polyamines, or alcohols or mixtures thereof. In these latter cases at least one amino reactant comprises alkylene polyamine bottoms.

Hydroxylalkyl alkylene polyamines having one or more hydroxyalkyl substituents on the nitrogen atoms, are also useful in preparing dispersant compositions. Preferred hydroxylalkyl-substituted alkylene polyamines are those in which the hydroxyalkyl group is a lower hydroxyalkyl group, i.e., paving less than eight carbon atoms. Examples of such hydroxyalkyl-substituted polyamines include N-(2-hydroxyethyl)ethylene diamine,N,N-bis(2-hydroxyethyl)ethylene diamine, 1-(2-hydroxyethyl)piperazine, monohydroxypropyl-substituted diethylene triamine, dihydroxypropyl-substituted tetraethylene pentamine, N-(2-hydroxybutyl)tetramethylene diamine, and the like. Higher homologs as are obtained by condensation of the above-illustrated hydroxy alkylene polyamines through amino radicals or through hydroxy radicals are likewise useful as (a). Condensation through amino radicals results in a higher amine accompanied by removal of ammonia and condensation through the hydroxy radicals results in products containing ether linkages accompanied by removal of water.

The amination process of this disclosure can be carried out by conventional methods known in the art. The process parameters should be sufficient to convert the epoxidized VTM to the amine product. Amination reaction conditions for the conversion of the epoxidized VTM to the amine, such as temperature, pressure and contact time, may also vary greatly and any suitable combination of such conditions may be employed herein. The reaction temperature may range between 25° C. to 250° C., and preferably between 30° C. to 200° C., and more preferably between 60° C. to 150° C. Normally the reaction is carried out under ambient pressure and the contact time may vary from a matter of seconds or minutes to a few hours or greater. The reactants can be added to the reaction mixture or combined in any order. The stir time employed can range from 0.5 to 48 hours, preferably from 1 to 36 hours, and more preferably from 2 to 24 hours.

Illustrative amine dispersants of this disclosure include, for example, the amination product of an epoxidized VTM and an amino compound containing at least one —NH— group, wherein the epoxidized VTM is reacted with the amino compound under amination conditions sufficient to give the amine dispersant.

In particular, illustrative amine dispersants of this disclosure include, for example, amination products of an epoxidized atatic polypropylene having a MW equivalent to 1000 with 3-aminopropyl morpholine or tetraethylenpetamine.

In accordance with this disclosure, the dispersant compositions can be represented by the formula $R_1R_2$ or $R_1(X)R_3$ wherein $R_1$ is a VTM group having from 10 to 400 carbon atoms, $R_2$ is an amino group containing at least one —NH— group, X is a polyamino group containing at least two —NH— groups, and $R_3$ is a VTM group having from 10 to 400 carbon atoms; wherein $R_1$ and $R_3$ are the same or different.

Such dispersants may be used in an amount of 0.1 to 20 wt %, preferably 0.1 to 8 wt %, more preferably 1 to 6 wt % (on an as-received basis) based on the weight of the total lubricant.

The dispersants of this disclosure can be solely a dispersant additive, or a multifunctional dispersant, e.g., a combined dispersant and antioxidant additive, a combined dispersant and anticorrosion additive, or a combined dispersant and antiwear additive.

In an embodiment, the amine dispersant can be further reacted with a compound having other functionality (in addition to the amino compound for dispersant functionality) to give a multifunctional composition. In particular, (i) the amine dispersant can be further reacted with a compound having antioxidant functionality to give a multifunctional composition having combined dispersant and antioxidant functionality, (ii) the amine dispersant is further reacted with a compound having anticorrosion functionality to give a multifunctional composition having combined dispersant and anticorrosion functionality, or (iii) the amine dispersant is further reacted with a compound having antiwear functionality to give a multifunctional composition having combined dispersant and antiwear functionality.

An illustrative multifunctional dispersant molecule prepared by the process of this disclosure is represented by the formula:

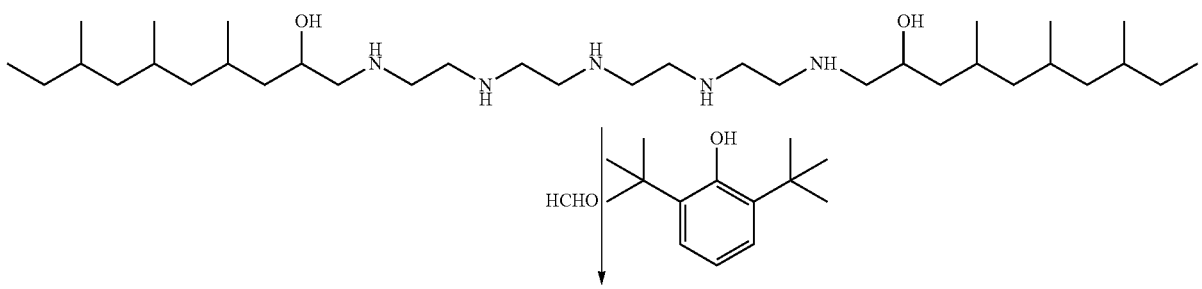

-continued

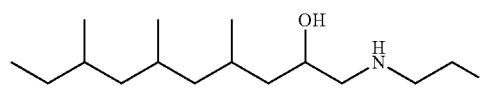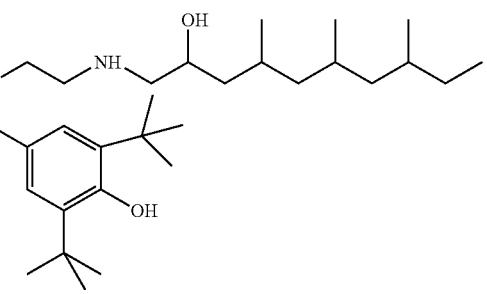

This disclosure provides a new class of lower viscosity multifunctional lube dispersant molecules. The dispersants are prepared, for example, using atactic polypropylene with vinyl termination as the hydrocarbon portion and polyamine as head portion of the molecules connected via linking group based on epoxidation chemistry. The epoxidation is achieved preferably based on hydrogen peroxide chemistry. The molecules can be modified, for example, with antioxidant-type molecule via formaldehyde chemistry to make multi-functional lube additives.

Lubricating Oil Base Stocks

A wide range of lubricating oils is known in the art. Lubricating oils that are useful in the present disclosure are both natural oils and synthetic oils. Natural and synthetic oils (or mixtures thereof) can be used unrefined, refined, or rerefined (the latter is also known as reclaimed or reprocessed oil). Unrefined oils are those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve the at least one lubricating oil property. One skilled in the art is familiar with many purification processes. These processes include solvent extraction, secondary distillation, acid extraction, base extraction, filtration, and percolation. Rerefined oils are obtained by processes analogous to refined oils but using an oil that has been previously used as a feed stock.

Groups I, II, III, IV and V are broad categories of base oil stocks developed and defined by the American Petroleum Institute (API Publication 1509; www.API.org) to create guidelines for lubricant base oils. Group I base stocks generally have a viscosity index of between 80 to 120 and contain greater than 0.03% sulfur and less than 90% saturates. Group II base stocks generally have a viscosity index of between 80 to 120, and contain less than or equal to 0.03% sulfur and greater than or equal to 90% saturates. Group III stock generally has a viscosity index greater than 120 and contains less than or equal to 0.03% sulfur and greater than 90% saturates. Group IV includes polyalphaolefins (PAO). Group V base stocks include base stocks not included in Groups I-IV. The table below summarizes properties of each of these five groups.

| | Base Oil Properties | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |

| | Base Oil Properties | | |
|---|---|---|---|
| | Saturates | Sulfur | Viscosity Index |
| Group III | ≥90 and | ≤0.03% and | ≥120 |
| Group IV | Includes polyalphaolefins (PAO) products | | |
| Group V | All other base oil stocks not included in Groups I, II, III or IV | | |

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale are also useful in the present disclosure. Natural oils vary also as to the method used for their production and purification, for example, their distillation range and whether they are straight run or cracked, hydrorefined, or solvent extracted.

Group II and/or Group III hydroprocessed or hydrocracked base stocks, as well as synthetic oils such as polyalphaolefins, alkyl aromatics and synthetic esters, i.e. Group IV and Group V oils are also well known base stock oils.

Synthetic oils include hydrocarbon oil such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stocks, the Group IV API base stocks, are a commonly used synthetic hydrocarbon oil. By way of example, PAOs derived from $C_8$, $C_{10}$, $C_{12}$, $C_{14}$ olefins or mixtures thereof may be utilized. See U.S. Pat. Nos. 4,956,122; 4,827,064; and 4,827,073, which are incorporated herein by reference in their entirety. Group IV oils, that is, the PAO base stocks have viscosity indices preferably greater than 130, more preferably greater than 135, still more preferably greater than 140.

Esters in a minor amount may be useful in the lubricating oils of this disclosure. Additive solvency and seal compatibility characteristics may be secured by the use of esters such as the esters of dibasic acids with monoalkanols and the polyol esters of monocarboxylic acids. Esters of the former type include, for example, the esters of dicarboxylic acids such as phthalic acid, succinic acid, sebacic acid, fumaric acid, adipic acid, linoleic acid dimer, malonic acid, alkyl malonic acid, alkenyl malonic acid, etc., with a variety of alcohols such as butyl alcohol, hexyl alcohol, dodecyl alcohol, 2-ethylhexyl alcohol, etc. Specific examples of these types of esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, etc.

Particularly useful synthetic esters are those which are obtained by reacting one or more polyhydric alcohols, preferably the hindered polyols such as the neopentyl polyols; e.g., neopentyl glycol, trimethylol ethane, 2-methyl-2-propyl-1,3-propanediol, trimethylol propane, pentaerythritol and dipentaerythritol with alkanoic acids containing at least 4 carbon atoms, preferably $C_5$ to $C_{30}$ acids such as saturated straight chain fatty acids including caprylic acid, capric acids, lauric acid, myristic acid, palmitic acid, stearic acid, arachic acid, and behenic acid, or the corresponding branched chain fatty acids or unsaturated fatty acids such as oleic acid, or mixtures of any of these materials.

Esters should be used in a amount such that the improved wear and corrosion resistance provided by the lubricating oils of this disclosure are not adversely affected.

Non-conventional or unconventional base stocks and/or base oils include one or a mixture of base stock(s) and/or base oil(s) derived from: (1) one or more Gas-to-Liquids (GTL) materials, as well as (2) hydrodewaxed, or hydroisomerized/cat (and/or solvent) dewaxed base stock(s) and/or base oils derived from synthetic wax, natural wax or waxy feeds, mineral and/or non-mineral oil waxy feed stocks such as gas oils, slack waxes (derived from the solvent dewaxing of natural oils, mineral oils or synthetic oils; e.g., Fischer-Tropsch feed stocks), natural waxes, and waxy stocks such as gas oils, waxy fuels hydrocracker bottoms, waxy raffinate, hydrocrackate, thermal crackates, foots oil or other mineral, mineral oil, or even non-petroleum oil derived waxy materials such as waxy materials recovered from coal liquefaction or shale oil, linear or branched hydrocarbyl compounds with carbon number of 20 or greater, preferably 30 or greater and mixtures of such base stocks and/or base oils.

GTL materials are materials that are derived via one or more synthesis, combination, transformation, rearrangement, and/or degradation/deconstructive processes from gaseous carbon-containing compounds, hydrogen-containing compounds and/or elements as feed stocks such as hydrogen, carbon dioxide, carbon monoxide, water, methane, ethane, ethylene, acetylene, propane, propylene, propyne, butane, butylenes, and butynes. GTL base stocks and/or base oils are GTL materials of lubricating viscosity that are generally derived from hydrocarbons; for example, waxy synthesized hydrocarbons, that are themselves derived from simpler gaseous carbon-containing compounds, hydrogen-containing compounds and/or elements as feed stocks. GTL base stock(s) and/or base oil(s) include oils boiling in the lube oil boiling range (1) separated/fractionated from synthesized GTL materials such as, for example, by distillation and subsequently subjected to a final wax processing step which involves either or both of a catalytic dewaxing process, or a solvent dewaxing process, to produce lube oils of reduced/low pour point; (2) synthesized wax isomerates, comprising, for example, hydrodewaxed or hydroisomerized cat and/or solvent dewaxed synthesized wax or waxy hydrocarbons; (3) hydrodewaxed or hydroisomerized cat and/or solvent dewaxed Fischer-Tropsch (F-T) material (i.e., hydrocarbons, waxy hydrocarbons, waxes and possible analogous oxygenates), preferably hydrodewaxed or hydroisomerized/followed by cat and/or solvent dewaxing dewaxed F-T waxy hydrocarbons, or hydrodewaxed or hydroisomerized/followed by cat (or solvent) dewaxing dewaxed, F-T waxes, or mixtures thereof.

GTL base stock(s) and/or base oil(s) derived from GTL materials, especially, hydrodewaxed or hydroisomerized/followed by cat and/or solvent dewaxed wax or waxy feed, preferably F-T material derived base stock(s) and/or base oil(s), are characterized typically as having kinematic viscosities at 100° C. of from 2 $mm^2$/s to 50 mm/s (ASTM D445). They are further characterized typically as having pour points of −5° C. to −40° C. or lower (ASTM D97). They are also characterized typically as having viscosity indices of 80 to 140 or greater (ASTM D2270).

In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) typically have very low sulfur and nitrogen content, generally containing less than 10 ppm, and more typically less than 5 ppm of each of these elements. The sulfur and nitrogen content of GTL base stock(s) and/or base oil(s) obtained from F-T material, especially F-T wax, is essentially nil. In addition, the absence of phosphorous and aromatics make this materially especially suitable for the formulation of low SAP products.

The term GTL base stock and/or base oil and/or wax isomerate base stock and/or base oil is to be understood as embracing individual fractions of such materials of wide viscosity range as recovered in the production process, mixtures of two or more of such fractions, as well as mixtures of one or two or more low viscosity fractions with one, two or more higher viscosity fractions to produce a blend wherein the blend exhibits a target kinematic viscosity.

The GTL material, from which the GTL base stock(s) and/or base oil(s) is/are derived is preferably an F-T material (i.e., hydrocarbons, waxy hydrocarbons, wax).

Base oils for use in the formulated lubricating oils useful in the present disclosure are any of the variety of oils corresponding to API Group I, Group II, Group III, Group IV, Group V and Group VI oils and mixtures thereof, preferably API Group II, Group III, Group IV, Group V and Group VI oils and mixtures thereof, more preferably the Group III to Group VI base oils due to their exceptional volatility, stability, viscometric and cleanliness features. Minor quantities of Group I stock, such as the amount used to dilute additives for blending into formulated lube oil products, can be tolerated but should be kept to a minimum, i.e. amounts only associated with their use as diluent/carrier oil for additives used on an "as received" basis. Even in regard to the Group II stocks, it is preferred that the Group II stock be in the higher quality range associated with that stock, i.e. a Group II stock having a viscosity index in the range 100<VI<120.

In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) and hydrodewaxed, or hydroisomerized/cat (and/or solvent) dewaxed base stock(s) and/or base oil(s) typically have very low sulfur and nitrogen content, generally containing less than 10 ppm, and more typically less than 5 ppm of each of these elements. The sulfur and nitrogen content of GTL base stock(s) and/or base oil(s) obtained from F-T material, especially F-T wax, is essentially nil. In addition, the absence of phosphorous and aromatics make this material especially suitable for the formulation of low sulfur, sulfated ash, and phosphorus (low SAP) products.

The basestock component of the present lubricating oils will typically be from 50 to 99 weight percent of the total composition (all proportions and percentages set out in this specification are by weight unless the contrary is stated) and more usually in the range of 80 to 99 weight percent.

Other Additives

The formulated lubricating oil useful in the present disclosure may additionally contain one or more of the other commonly used lubricating oil performance additives including but not limited to dispersants, other detergents, corrosion inhibitors, rust inhibitors, metal deactivators, other anti-wear agents and/or extreme pressure additives, anti-seizure agents, wax modifiers, viscosity index improvers, viscosity modifiers, fluid-loss additives, seal compatibility agents, other friction modifiers, lubricity agents, anti-staining agents, chromophoric agents, defoamants, demulsifiers, emulsifiers, densifiers, wetting agents, gelling agents, tackiness agents, colorants, and others. For a review of many commonly used additives, see Klamann in Lubricants and Related Products, Verlag Chemie, Deerfield Beach, Fla.; ISBN 0-89573-177-0. Reference is also made to "Lubricant Additives Chemistry and Applications" edited by Leslie R. Rudnick, Marcel Dekker, Inc. New York, 2003 ISBN: 0-8247-0857-1.

The types and quantities of performance additives used in combination with the instant disclosure in lubricant compositions are not limited by the examples shown herein as illustrations.

Viscosity Improvers

Viscosity improvers (also known as Viscosity Index modifiers, and VI improvers) increase the viscosity of the oil composition at elevated temperatures which increases film thickness, while having limited effect on viscosity at low temperatures.

Suitable viscosity improvers include high molecular weight hydrocarbons, polyesters and viscosity index improver dispersants that function as both a viscosity index improver and a dispersant. Typical molecular weights of these polymers are between 10,000 to 1,000,000, more typically 20,000 to 500,000, and even more typically between 50,000 and 200,000.

Examples of suitable viscosity improvers are polymers and copolymers of methacrylate, butadiene, olefins, or alkylated styrenes. Polyisobutylene is a commonly used viscosity index improver. Another suitable viscosity index improver is polymethacrylate (copolymers of various chain length alkyl methacrylates, for example), some formulations of which also serve as pour point depressants. Other suitable viscosity index improvers include copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight.

The amount of viscosity modifier may range from zero to 8 wt %, preferably zero to 4 wt %, more preferably zero to 2 wt % based on active ingredient and depending on the specific viscosity modifier used.

Antioxidants

Typical antioxidant include phenolic antioxidants, aminic antioxidants and oil-soluble copper complexes.

The phenolic antioxidants include sulfurized and non-sulfurized phenolic antioxidants. The terms "phenolic type" or "phenolic antioxidant" used herein includes compounds having one or more than one hydroxyl group bound to an aromatic ring which may itself be mononuclear, e.g., benzyl, or poly-nuclear, e.g., naphthyl and spiro aromatic compounds. Thus "phenol type" includes phenol per se, catechol, resorcinol, hydroquinone, naphthol, etc., as well as alkyl or alkenyl and sulfurized alkyl or alkenyl derivatives thereof, and bisphenol type compounds including such bi-phenol compounds linked by alkylene bridges sulfuric bridges or oxygen bridges. Alkyl phenols include mono- and poly-alkyl or alkenyl phenols, the alkyl or alkenyl group containing from 3-100 carbons, preferably 4 to 50 carbons and sulfurized derivatives thereof, the number of alkyl or alkenyl groups present in the aromatic ring ranging from 1 to up to the available unsatisfied valences of the aromatic ring remaining after counting the number of hydroxyl groups bound to the aromatic ring.

Generally, therefore, the phenolic antioxidant may be represented by the general formula:

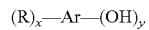

$(R)_x$—Ar—$(OH)_y$ where Ar is selected from the group consisting of:

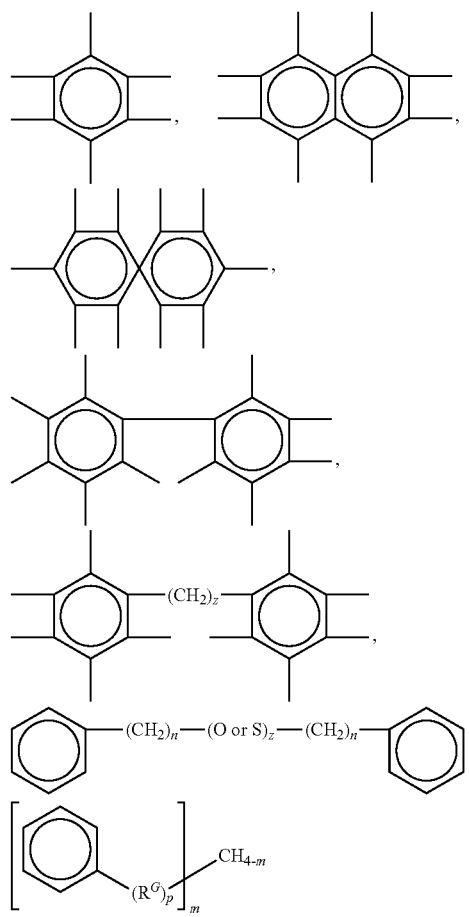

wherein R is a $C_3$-$C_{100}$ alkyl or alkenyl group, a sulfur substituted alkyl or alkenyl group, preferably a $C_4$-$C_{50}$ alkyl or alkenyl group or sulfur substituted alkyl or alkenyl group, more preferably $C_3$-$C_{100}$ alkyl or sulfur substituted alkyl group, most preferably a $C_4$-$C_{50}$ alkyl group, $R^g$ is a $C_1$-$C_{100}$ alkylene or sulfur substituted alkylene group, preferably a $C_2$-$C_{50}$ alkylene or sulfur substituted alkylene group, more preferably a $C_2$-$C_2$ alkylene or sulfur substituted alkylene group, y is at least 1 to up to the available valences of Ar, x ranges from 0 to up to the available valances of Ar-y, z ranges from 1 to 10, n ranges from 0 to 20, and m is 0 to 4 and p is 0 or 1, preferably y ranges from 1 to 3, x ranges from 0 to 3, z ranges from 1 to 4 and n ranges from 0 to 5, and p is 0.

Preferred phenolic anti-oxidant compounds are the hindered phenolics and phenolic esters which contain a sterically hindered hydroxyl group, and these include those derivatives of dihydroxy aryl compounds in which the hydroxyl groups are in the o- or p-position to each other. Typical phenolic antioxidants include the hindered phenols substituted with $C_1+$ alkyl groups and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; 2-methyl-6-t-butyl-4-dodecyl phenol; 2,6-di-t-butyl-4 methyl phenol; 2,6-di-t-butyl-4-ethyl phenol; and 2,6-di-t-butyl 4 alkoxy phenol; and

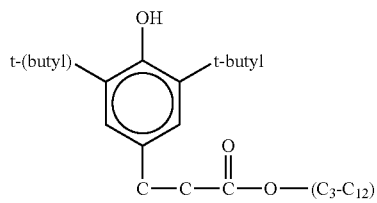

Phenolic type antioxidants are well known in the lubricating industry and commercial examples such as Ethanox® 4710, Irganox® 1076, Irganox® L1035, Irganox® 1010, Irganox® L109, Irganox® L 18, Irganox® L135 and the like are familiar to those skilled in the art. The above is presented only by way of exemplification, not limitation on the type of phenolic antioxidants which can be used.

The phenolic antioxidant can be employed in an amount in the range of 0.1 to 3 wt %, preferably 1 to 3 wt %, more preferably 1.5 to 3 wt % on an active ingredient basis.

Aromatic amine antioxidants include phenyl-α-naphthyl amine which is described by the following molecular structure:

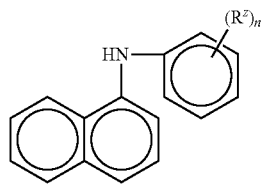

wherein $R^z$ is hydrogen or a $C_1$ to $C_{14}$ linear or $C_3$ to $C_{14}$ branched alkyl group, preferably $C_1$ to $C_{10}$ linear or $C_3$ to $C_{10}$ branched alkyl group, more preferably linear or branched $C_6$ to $C_8$ and n is an integer ranging from 1 to 5 preferably 1. A particular example is Irganox L06.

Other aromatic amine anti-oxidants include other alkylated and non-alkylated aromatic amines such as aromatic monoamines of the formula $R^8R^9R^{10}N$ where $R^s$ is an aliphatic, aromatic or substituted aromatic group, $R^9$ is an aromatic or a substituted aromatic group, and $R^{10}$ is H, alkyl, aryl or $R^{11}S(O)_xR^{12}$ where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to 20 carbon atoms, and preferably contains from 6 to 12 carbon atoms. The aliphatic group is a saturated aliphatic group. Preferably, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amines antioxidants have alkyl substituent groups of at least 6 carbon atoms. Examples of aliphatic groups include hexyl, heptyl, octyl, nonyl, and decyl. Generally, the aliphatic groups will not contain more than 14 carbon atoms. The general types of such other additional amine antioxidants which may be present include diphenylamines, phenothiazines, imidodibenzyls and diphenyl phenylene diamines. Mixtures of two or more of such other additional aromatic amines may also be present. Polymeric amine antioxidants can also be used.

Another class of antioxidant used in lubricating oil compositions and which may also be present are oil-soluble copper compounds. Any oil-soluble suitable copper compound may be blended into the lubricating oil. Examples of suitable copper antioxidants include copper dihydrocarbyl thio- or dithio-phosphates and copper salts of carboxylic acid (naturally occurring or synthetic). Other suitable copper salts include copper dithiacarbamates, sulphonates, phenates, and acetylacetonates. Basic, neutral, or acidic copper Cu(I) and or Cu(II) salts derived from alkenyl succinic acids or anhydrides are known to be particularly useful.

Such antioxidants may be used individually or as mixtures of one or more types of antioxidants, the total amount employed being an amount of 0.50 to 5 wt %, preferably 0.75 to 3 wt % (on an as-received basis).

Detergents

In addition to the alkali or alkaline earth metal salicylate detergent which is an essential component in the present disclosure, other detergents may also be present. While such other detergents can be present, it is preferred that the amount employed be such as to not interfere with the synergistic effect attributable to the presence of the salicylate. Therefore, most preferably such other detergents are not employed.

If such additional detergents are present, they can include alkali and alkaline earth metal phenates, sulfonates, carboxylates, phosphonates and mixtures thereof. These supplemental detergents can have total base number (TBN) ranging from neutral to highly overbased, i.e. TBN of 0 to over 500, preferably 2 to 400, more preferably 5 to 300, and they can be present either individually or in combination with each other in an amount in the range of from 0 to 10 wt %, preferably 0.5 to 5 wt % (active ingredient) based on the total weight of the formulated lubricating oil. As previously stated, however, it is preferred that such other detergent not be present in the formulation.

Such additional other detergents include by way of example and not limitation calcium phenates, calcium sulfonates, magnesium phenates, magnesium sulfonates and other related components (including borated detergents).

Pour Point Depressants

Conventional pour point depressants (also known as lube oil flow improvers) may also be present. Pour point depressant may be added to lower the minimum temperature at which the fluid will flow or can be poured. Examples of suitable pour point depressants include alkylated naphthalenes polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. Such additives may be used in amount of 0.0 to 0.5 wt %, preferably 0 to 0.3 wt %, more preferably 0.001 to 0.1 wt % on an as-received basis.

Corrosion Inhibitors/Metal Deactivators

Corrosion inhibitors are used to reduce the degradation of metallic parts that are in contact with the lubricating oil composition. Suitable corrosion inhibitors include aryl thiazines, alkyl substituted dimercapto thiodiazoles thiadiazoles and mixtures thereof. Such additives may be used in an amount of 0.01 to 5 wt %, preferably 0.01 to 1.5 wt %, more preferably 0.01 to 0.2 wt %, still more preferably 0.01 to 0.1 wt % (on an as-received basis) based on the total weight of the lubricating oil composition.

Seal Compatibility Additives

Seal compatibility agents help to swell elastomeric seals by causing a chemical reaction in the fluid or physical change in the elastomer. Suitable seal compatibility agents for lubricating oils include organic phosphates, aromatic esters, aromatic hydrocarbons, esters (butylbenzyl phthalate, for example), and polybutenyl succinic anhydride and sulfolane-type seal swell agents such as Lubrizol 730-type seal swell additives. Such additives may be used in an amount of 0.01 to 3 wt %, preferably 0.01 to 2 wt % on an as-received basis.

Anti-Foam Agents

Anti-foam agents may advantageously be added to lubricant compositions. These agents retard the formation of stable foams. Silicones and organic polymers are typical antifoam agents. For example, polysiloxanes, such as silicon oil or polydimethyl siloxane, provide antifoam properties. Antifoam agents are commercially available and may be used in conventional minor amounts along with other additives such as demulsifiers; usually the amount of these additives combined is less than 1 percent, preferably 0.001 to 0.5 wt %, more preferably 0.001 to 0.2 wt %, still more preferably 0.0001 to 0.15 wt % (on an as-received basis) based on the total weight of the lubricating oil composition.

Inhibitors and Antirust Additives

Antirust additives (or corrosion inhibitors) are additives that protect lubricated metal surfaces against chemical attack by water or other contaminants. One type of antirust additive is a polar compound that wets the metal surface preferentially, protecting it with a film of oil. Another type of antirust additive absorbs water by incorporating it in a water-in-oil emulsion so that only the oil touches the surface. Yet another type of antirust additive chemically adheres to the metal to produce a non-reactive surface. Examples of suitable additives include zinc dithiophosphates, metal phenolates, basic metal sulfonates, fatty acids and amines. Such additives may be used in an amount of 0.01 to 5 wt %, preferably 0.01 to 1.5 wt % on an as-received basis.

In addition to the ZDDP anti-wear additives which are essential components of the present disclosure, other anti-wear additives can be present, including zinc dithiocarbamates, molybdenum dialkyldithiophosphates, molybdenum dithiocarbamates, other organo molybdenum-nitrogen complexes, sulfurized olefins, etc.

The term "organo molybdenum-nitrogen complexes" embraces the organo molybdenum-nitrogen complexes described in U.S. Pat. No. 4,889,647. The complexes are reaction products of a fatty oil, dithanolamine and a molybdenum source. Specific chemical structures have not been assigned to the complexes. U.S. Pat. No. 4,889,647 reports an infrared spectrum for a typical reaction product of that disclosure; the spectrum identifies an ester carbonyl band at 1740 cm$^{-1}$ and an amide carbonyl band at 1620 cm$^{-1}$. The fatty oils are glyceryl esters of higher fatty acids containing at least 12 carbon atoms up to 22 carbon atoms or more. The molybdenum source is an oxygen-containing compound such as ammonium molybdates, molybdenum oxides and mixtures.

Other organo molybdenum complexes which can be used in the present disclosure are tri-nuclear molybdenum-sulfur compounds described in EP 1 040 115 and WO 99/31113 and the molybdenum complexes described in U.S. Pat. No. 4,978,464.

The lubricant compositions of this disclosure comprise an oil of lubricating viscosity and from 0.1 to 15 weight percent based on the total weight of the lubricant composition, of a dispersant of this disclosure. The lubricant compositions have a viscosity ($Kv_{100}$) from 2 to 8 at 100° C., preferably from 2.1 to 6 at 100° C., and more preferably from 2.5 to 4 at 100° C. The lubricant compositions have a viscosity index (VI) from 100 to 160, preferably from 105 to 155, and more preferably from 110 to 150. As used herein, viscosity ($Kv_{100}$) is determined by ASTM D 445-01, and viscosity index (VI) is determined by ASTM D 2270-93 (1998).

A lubricating oil containing an amine dispersant of this disclosure possesses a lower viscosity ($Kv_{100}$) as compared to viscosity ($Kv_{100}$) of a same lubricating oil except containing PIBSI (polyisobutylenesuccinimide) as a dispersant on an equal weight percent basis. A lubricating oil containing an amine dispersant of this disclosure can also exhibit better oxidation resistance as compared to oxidation resistance of a same lubricating oil except containing PIBSI (polyisobutylenesuccinimide) as a dispersant on an equal weight percent basis.

The lubricant compositions of this disclosure possess low viscosity, low Noack volatility and superior low temperature properties. The polyolefin products of this disclosure can exhibit excellent bulk flow properties.

The lubricant compositions of this disclosure have a Noack volatility of no greater than 20 percent, preferably no greater than 18 percent, and more preferably no greater than 15 percent. As used herein, Noack volatility is determined by ASTM D-5800.

This disclosure provides lubricating oils useful as engine oils and in other applications characterized by excellent dispersancy characteristics, as well as excellent low volatility and low temperature characteristics. The lubricating oils are based on high quality base stocks including a major portion of a hydrocarbon base fluid such as a PAO or GTL with a dispersant as described herein. The lubricating oil base stock can be any oil boiling in the lube oil boiling range, typically between 100 to 450° C. In the present specification and claims, the terms base oil(s) and base stock(s) are used interchangeably.

The viscosity-temperature relationship of a lubricating oil is one of the critical criteria which must be considered when selecting a lubricant for a particular application. Viscosity Index (VI) is an empirical, unitless number which indicates the rate of change in the viscosity of an oil within a given temperature range. Fluids exhibiting a relatively large change in viscosity with temperature are said to have a low viscosity index. A low VI oil, for example, will thin out at elevated temperatures faster than a high VI oil. Usually, the high VI oil is more desirable because it has higher viscosity at higher temperature, which translates into better or thicker lubrication film and better protection of the contacting machine elements.

In another aspect, as the oil operating temperature decreases, the viscosity of a high VI oil will not increase as much as the viscosity of a low VI oil. This is advantageous because the excessive high viscosity of the low VI oil will decrease the efficiency of the operating machine. Thus high VI (HVI) oil has performance advantages in both high and low temperature operation. VI is determined according to ASTM method D 2270-93 [1998]. VI is related to kinematic viscosities measured at 40° C. and 100° C. using ASTM Method D 445-01.

In the above detailed description, the specific embodiments of this disclosure have been described in connection with its preferred embodiments. However, to the extent that the above description is specific to a particular embodiment or a particular use of this disclosure, this is intended to be illustrative only and merely provides a concise description of the exemplary embodiments. Accordingly, the disclosure is not limited to the specific embodiments described above, but rather, the disclosure includes all alternatives, modifications, and equivalents falling within the true scope of the appended claims. Various modifications and variations of this disclosure will be obvious to a worker skilled in the art and it is to be understood that such modifications and variations are to be included within the purview of this application and the spirit and scope of the claims.

The following are examples of the present disclosure and are not to be construed as limiting.

EXAMPLES

Product Characterization and Test Methods

Products were characterized by $^1$H NMR and $^{13}$C NMR as follows:

$^1$HR NMR $^1$H NMR data was collected at either room temperature or 120° C. (for purposes of the claims, 120° C. shall be used) in a 5 mm probe using a spectrometer with a $^1$H frequency of at least 400 MHz. Data was recorded using a maximum pulse width of 45° C., 8 seconds between pulses and signal averaging 120 transients.

$^{13}$C NMR $^{13}$C NMR data was collected at 120° C. using a spectrometer with a $^{13}$C frequency of at least 100 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired with time averaging to provide a signal to noise level adequate to measure the signals of interest. Samples were dissolved in tetrachloroethane-d$_2$ (TCE) at concentrations between 10 to 15 wt % prior to being inserted into the spectrometer magnet.

Prior to data analysis spectra were referenced by setting the chemical shift of the TCE solvent signal to 74.39 ppm.

All molecular weights are g/mol unless otherwise noted.

Example 1

Epoxidation of Vinyl Terminated Propylene-Hexene Macromere (Mw: 1370)

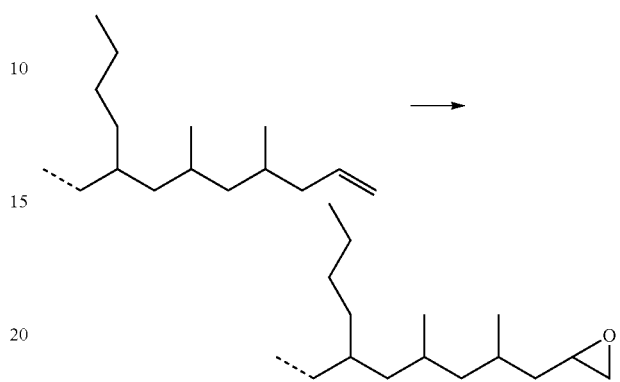

Charged the vinyl terminated propylene-hexene (MW: 1370) (4.32 grams, 0.0315 mol) in 250 milliliter round bottom flask with 30 milliliters of methylene chloride. At 10-15° C. (1.41 grams, 0.0773 mol) 3-chloroperoxybenzoic acid was added by small portion. The resulting reaction mixture was stirred at 0° C. for 1 hour and allowed to warm to room temperature with stirring for 48 hours. The reaction mixture was washed with saturated NaHCO$_3$ solution (2×50 milliliters), 5% sodium bisulfite (1×30 milliliters) and brine, (1×50 milliliters) until the aqueous layer attained pH 7. The separated methylene chloride layer was dried over anhydrous MgSO$_4$ and filtered. The low boiling methylene chloride was removed using a rotary evaporator at 40° C. under house vacuum and high boiling components at 120° C. under high vacuum. The purification was done by reprecipitation in hexane/MeOH. The final product yield was 4.02 grams (93%). The product $^1$H NMR analysis suggests the formation of 1,2-epoxy vinyl terminated propylene-hexene macromer (Mw: 1386).

Example 2

Amination of Epoxodized Vinyl Terminated Propylene-Hexene Macromer

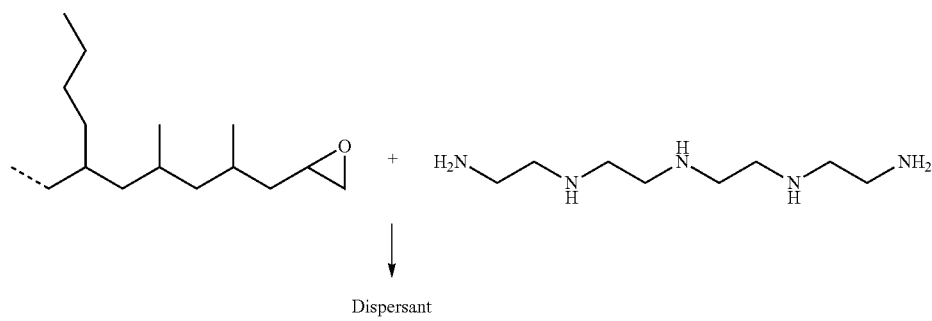

Charged the 1,2-epoxy vinyl terminated propylene-hexene macromer (4.0 grams, 0.0029 mol) and tetraethylenepentamine (0.273 grams, 0.00144 mol) in a 100 milliliter round bottom flask with 25 milliliters of ethanol and 25 milliliters of toluene. The reaction mixture refluxed 48 hours with stirring. After cooling, removed the ethanol and toluene with a rotary evaporator at 85-90° C. and high boiling components with an air bath oven at 180° C. under vacuum. The purification was done by reprecipitation in hexane/MeOH. The final viscous yellow product yield was 4.0 grams (99%). The product $^1$H NMR analysis suggests the formation of amino alcohol of 1,2-epoxy vinyl terminated propylene-hexene macromer and tetraethylenepentamine.

Example 3

Epoxidation of Atactic Vinyl Terminated Polypropylene Macromer (Mw 1000)

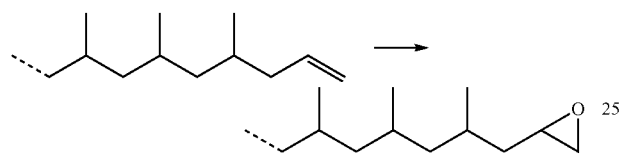

Charged the atactic vinyl terminated polypropylene (Mw: 1000) macromer (51.5 grams, 0.0515 mol) in 500 milliliter round bottom flask with 100 milliliters of methylene chloride. At 0° C. (17.3 grams, 0.0773 mol) 3-chloroperoxybenzoic acid was added by small portion. The resulting reaction mixture was stirred at 0° C. for 1 hour and allowed to warm to room temperature overnight with stirring. The reaction mixture washed with saturated NaHCO$_3$ solution (1×200 milliliters), 5% sodium bisulfite (1×100 milliliters) and brine (1×100 milliliters) until, the aqueous layer attained pH 7. The separated methylene chloride layer was dried over anhydrous MgSO$_4$ and filtered. The low boiling methylene chloride was removed from using a rotary evaporator at 60° C. under house vacuum and high boiling components at 120° C. under high vacuum. The purification was done by re precipitation in hexane/MeOH. The final product yield was 42.8 grams (83%). The product $^1$H NMR analysis suggests the formation of 1,2-epoxy atactic vinyl terminated polypropylene macromer (Mw: 1016).

Example 4

Amination of Epoxidized Vinyl Terminated Atactic Polypropylene Macromer

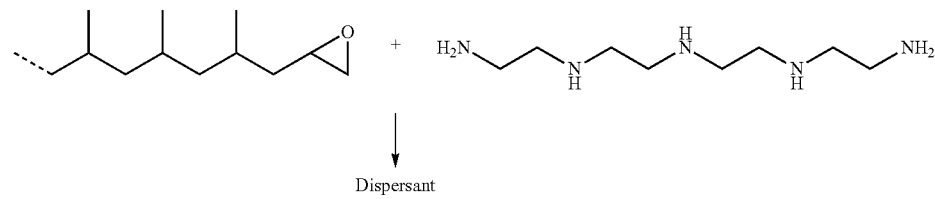

Dispersant

Charged the 1,2-epoxy atactic polypropylene macromer (42.8 grams, 0.04212 mol) and tetraethylenepentamine (4.0 grams, 0.02113 mol) in a 500 milliliter round bottom flask with 30 milliliters of ethanol and 50 milliliters of toluene. The reaction mixture refluxed 48 hours with stirring. After cooling, remove the ethanol and toluene with a rotary evaporator and high boiling components with an air bath oven at 150° C. under vacuum. The purification was done by reprecipitation in hexane/MeOH. The final viscous yellow product yield was 46.2 grams (99%). The product $^1$H NMR analysis suggests the formation of tetra amino alcohol of 1,2-epoxy atactic polypropylene (Mw: 1000) and tetraethylenepentamine.

The polyamine head or hydroxyl group can potentially can be further modified to obtain multifunctional dispersant. For example, one can react 2,6-di-t-butylphenol, diphenylamine, benzotriazole via formaldehyde to obtain a dispersant-antioxidant molecule.

The dispersant of this Example 4 was evaluated along with commercial dispersants and results are shown below. PDSC is Pressure Differential Scanning Calorimetry and is a measure of oxidative stability of lubricants.

| Component | Type | A | B | C | D | E | F |
|---|---|---|---|---|---|---|---|
| Blend Midas No. | | 11-42233 | 11-42234 | 11-42240 | 11-42243 | 11-42244 | 11-132940 |
| PAO 4 | | 89.5 | 89.5 | 89.5 | 89.5 | 89.5 | 89.5 |
| Irganox L57 | Amine Antioxidant | 0.5 | 0.5 | 0.5 | 0.5 | 0.5 | 0.5 |

-continued

| Component | Type | A | B | C | D | E | F |
|---|---|---|---|---|---|---|---|
| Commercial dispersant 1 | PIBSA-PAM | 10 | | | | | |
| Commercial dispersant 2 | PIBSA-PAM | | 10 | | | | |
| Commercial dispersant 3 | PIBSA-PAM | | | 10 | | | |
| Commercial dispersant 4 | PIBSA-PAM | | | | 10 | | |
| Commercial dispersant 5 | PIBSA-PAM | | | | | 10 | |
| Example 4 (50% active level) Test | aPP-epoxide-PAM | | | | | | 10 |
| KV 40 (H445-3) | | 32.72 | 32.57 | 29.30 | 28.33 | 29.75 | 23.51 |
| KV 100 (H445-5) | | 6.38 | 6.48 | 5.76 | 5.86 | 6.05 | 4.91 |
| PDSC | Onset Temp (C.) | 244.2 | 240.5 | 239.1 | 238.2 | 240.8 | 237.8 |

Commercial dispersant 1 has a trade name Infineum ® C-9268
Commercial dispersant 2 has a trade name Infineum ® C-9280
Commercial dispersant 3 has a trade name Hitec ® 638
Commercial dispersant 4 has a trade name Oloa ® 13000
Commercial dispersant 5 has a trade name Oloa ® 11000

Since all commercial dispersants contain diluent oils, Example 4 is also diluted with equal amount of PAO4 to make a 50 wt % active dispersant. At 10 wt % treat rate of Example 4, oil F offers significantly lower viscosity than all commercial dispersant blends at equal treat rates. Comparable PDSC results indicate that aPP derived epoxide-polyamine dispersant possesses equivalent thermo-oxidative stability to commercial dispersants.

All documents described herein are incorporated by reference herein, including any priority documents and/or testing procedures to the extent they are not inconsistent with this text, provided however that any priority document not named in the initially filed application or filing documents is not incorporated by reference herein. When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. A composition for use as an additive for fuels and lubricants comprising an amination product of an epoxidized vinyl terminated macromonomer (VTM) and an amino compound containing at least one —NH— group, wherein the epoxidized VTM is reacted with the amino compound containing at least one —NH— group under amination conditions sufficient to give said composition; wherein the epoxidized VTM is a propylene oligomer comprising at least 50 mol % propylene and from 0.1 mol % to 5 mol % $C_4$ to $C_{12}$ olefin, wherein the oligomer has at least 90% allyl chain ends, an Mn of 150 g/mol to 10,000 g/mol, and an isobutyl chain end to allylic vinyl group ratio of 0.8:1 to 1.35:1.0.

2. The composition of claim 1 wherein the epoxidized VTM is formed by reacting a VTM with an epoxidizing agent under epoxidation conditions sufficient to give the epoxidized VTM.

3. The composition of claim 1 wherein the amino compound is a monoamine or polyamine.

4. The composition of claim 1 wherein the epoxidized VTM is an isotactic or atatic polypropylene having an average MW between 500 and 5000.

5. The composition of claim 1 which (i) is further reacted via formaldehyde coupling with a compound having antioxidant functionality to give a multifunctional composition having combined dispersant and antioxidant functionality, (ii) is further reacted via formaldehyde coupling with a compound having anticorrosion functionality to give a multifunctional composition having combined dispersant and anticorrosion functionality, or (iii) is further reacted via formaldehyde coupling with a compound having antiwear functionality to give a multifunctional composition having combined dispersant and antiwear functionality, or (iv) is further reacted with a boron containing compound to give a borated composition.

6. The composition of claim 1 which is a dispersant additive, a combined dispersant and viscosity index improver additive, a combined dispersant and antioxidant additive, a combined dispersant and anticorrosion additive, or a combined dispersant and antiwear additive.

7. A composition for use as an additive for fuels and lubricants comprising an epoxidation/amination product of a VTM and an amino compound containing at least one
—NH— group, wherein the VTM is reacted with an epoxidizing agent under epoxidation conditions sufficient to give an epoxidized VTM intermediate, and the epoxidized VTM intermediate is reacted with the amino compound containing at least one —NH— group under amination conditions sufficient to give said composition.

8. A lubricant composition comprising an oil of lubricating viscosity and from 0.1 to 15 weight percent based on the total weight of the lubricant composition, of the composition of claim 1.

9. The lubricant composition of claim 8 wherein the oil comprises a Group I, II, III, IV, or V base oil stock, or mixtures thereof.

10. The lubricant composition of claim 8 which has a viscosity ($Kv_{100}$) from 2 to 8 at 100° C., and a viscosity index (VI) from 100 to 160.

11. The lubricant composition of claim 8 which possesses a lower viscosity ($Kv_{100}$) as compared to viscosity ($Kv_{100}$) of a same lubricating oil except containing PIBSI (polyisobutylenesuccinimide) as a dispersant on an equal weight percent basis.

12. The lubricant composition of claim 8 further comprising one or more of a viscosity improver, antioxidant, detergent, pour point depressant, corrosion inhibitor, metal deactivator, seal compatibility additive, anti-foam agent, inhibitor, and anti-rust additive.

13. The lubricant composition of claim 8 which is a passenger vehicle engine oil.

14. A vehicle having moving parts and containing a lubricant for lubricating the moving parts, the lubricant comprising an oil of lubricating viscosity and from 0.1 to 15 weight percent based on the total weight of the lubricant composition, of the composition of claim 1.

15. An amination method for making a composition for use as an additive for fuels and lubricants, the method comprising reacting an epoxidized VTM with an amino compound containing at least one —NH— group under amination conditions sufficient to give said composition.

16. The amination method of claim 15 wherein the epoxidized VTM is formed by reacting a VTM with an epoxidizing agent under epoxidation conditions sufficient to give the epoxidized VTM.

17. An epoxidation/amination method for making a composition for use as an additive for fuels and lubricants, the method comprising reacting a VTM with an epoxidizing agent under epoxidation conditions sufficient to give an epoxidized VTM intermediate, and reacting the epoxidized VTM intermediate with an amino compound containing at least one —NH— group under amination conditions sufficient to give said composition.

18. The epoxidation/amination method of claim 17 wherein the composition is a dispersant additive, a combined dispersant and viscosity index improver additive, a combined dispersant and antioxidant additive, a combined dispersant and anticorrosion additive, or a combined dispersant and antiwear additive.

19. A dispersant composition for fuels and lubricants represented by the formula $$R_1R_2$$

or $$R_1(X)R_3$$

wherein $R_1$ is a VTM group having from 10 to 400 carbon atoms, $R_2$ is an amino group containing at least one —NH— group, X is a polyamino group containing at least two —NH— groups, and $R_3$ is a VTM group having from 10 to 400 carbon atoms; wherein $R_1$ and $R_3$ are the same or different.

* * * * *